(12) United States Patent
Hemmer et al.

(10) Patent No.: US 10,733,766 B2
(45) Date of Patent: Aug. 4, 2020

(54) METHODS AND APPARATUS TO ENCODE AND/OR DECODE NORMALS OF GEOMETRIC REPRESENTATIONS OF SURFACES

(71) Applicant: Google Inc., Mountain View, CA (US)

(72) Inventors: Michael Hemmer, San Francisco, CA (US); Lauren DeNaut, San Francisco, CA (US)

(73) Assignee: GOOGLE, LLC, Mountain View, CA (US)

( * ) Notice: Subject to any disclaimer, the term of this patent is extended or adjusted under 35 U.S.C. 154(b) by 404 days.

(21) Appl. No.: 15/475,639

(22) Filed: Mar. 31, 2017

(65) Prior Publication Data
US 2018/0108151 A1 Apr. 19, 2018

Related U.S. Application Data

(63) Continuation-in-part of application No. 15/297,801, filed on Oct. 19, 2016, now Pat. No. 10,313,673.

(51) Int. Cl.
*H04N 7/12* (2006.01)
*G06T 9/00* (2006.01)
*G06T 17/20* (2006.01)

(52) U.S. Cl.
CPC ............... *G06T 9/001* (2013.01); *G06T 9/00* (2013.01); *G06T 17/20* (2013.01)

(58) Field of Classification Search
CPC ............ G06T 9/001; G06T 9/00; G06T 17/20
(Continued)

(56) References Cited

U.S. PATENT DOCUMENTS 6,088,035 A 7/2000 Sudarsky et al.
6,167,159 A 12/2000 Touma et al.
(Continued)

FOREIGN PATENT DOCUMENTS

CN 102467753 B 10/2013
CN 102682103 B 3/2014
(Continued)

OTHER PUBLICATIONS

International Search Report and Written Opinion for International Application No. PCT/US2017/057193, dated Feb. 2, 2018, 14 pages.
(Continued)

*Primary Examiner* — Richard T Torrente
(74) *Attorney, Agent, or Firm* — Brake Hughes Bellermann LLP

(57) ABSTRACT

Methods and apparatus to encode and/or decode normals of geometric representations of surfaces are disclosed herein. An example method includes receiving a plurality of points, each point representing a normal to the surface and being arranged within a tile; generating a plurality of regions within the tile, each region including points of the plurality of points; retrieving a first and second point, the first point representing a first normal and the second point representing a second normal, the first point being outside of a specified baseline region; performing a point transformation operation on the first point to produce a transformed first point of the baseline region and performing the point transformation on the second point to produce a transformed second point; generating a difference between the transformed first point and the transformed second point to produce a difference value; and encoding the difference value.

20 Claims, 18 Drawing Sheets

(58) Field of Classification Search
USPC .................................................. 375/240.14
See application file for complete search history.

(56) References Cited

U.S. PATENT DOCUMENTS

| | | | |
|---|---|---|---|
| 6,204,854 B1* | 3/2001 | Signes | G06T 9/00 345/427 |
| 6,262,737 B1 | 7/2001 | Li et al. | |
| 6,525,722 B1 | 2/2003 | Deering et al. | |
| 6,532,012 B2 | 3/2003 | Deering et al. | |
| 6,563,500 B1 | 5/2003 | Seo et al. | |
| 6,603,470 B1* | 8/2003 | Deering | G06T 9/001 345/419 |
| 6,879,324 B1 | 4/2005 | Hoppe et al. | |
| 7,103,211 B1 | 9/2006 | Medioni et al. | |
| 7,280,109 B2 | 10/2007 | Hoppe et al. | |
| 7,283,134 B2 | 10/2007 | Hoppe et al. | |
| 7,804,498 B1 | 9/2010 | Graham et al. | |
| 8,022,951 B2 | 9/2011 | Zhirkov et al. | |
| 8,217,941 B2 | 7/2012 | Park et al. | |
| 8,390,622 B2 | 3/2013 | Park et al. | |
| 8,619,085 B2 | 12/2013 | Keall et al. | |
| 8,660,376 B2 | 2/2014 | Ahn et al. | |
| 8,736,603 B2 | 5/2014 | Curington et al. | |
| 8,805,097 B2 | 8/2014 | Lee et al. | |
| 8,811,758 B2 | 8/2014 | Leed et al. | |
| 8,884,953 B2 | 11/2014 | Teng et al. | |
| 8,949,092 B2 | 2/2015 | Chen et al. | |
| 9,064,311 B2 | 6/2015 | Mammou et al. | |
| 9,111,333 B2 | 8/2015 | Jiang | |
| 9,171,383 B2 | 10/2015 | Lee et al. | |
| 9,348,860 B2 | 5/2016 | Cai et al. | |
| 9,396,512 B2 | 7/2016 | Karras | |
| 9,424,663 B2 | 8/2016 | Ahn et al. | |
| 2004/0208382 A1 | 10/2004 | Gioia et al. | |
| 2011/0010400 A1 | 1/2011 | Hayes et al. | |
| 2012/0306875 A1 | 12/2012 | Cai et al. | |
| 2014/0168360 A1 | 6/2014 | Ahn et al. | |
| 2014/0303944 A1 | 10/2014 | Jiang et al. | |
| 2016/0086353 A1 | 3/2016 | Zalik et al. | |
| 2017/0358126 A1* | 12/2017 | Lim | G06T 3/0062 |

FOREIGN PATENT DOCUMENTS

| | | | |
|---|---|---|---|
| KR | 1019990085657 A | 12/1999 | |
| KR | 1020010008944 A | 2/2001 | |
| KR | 1020030071019 A | 9/2003 | |
| KR | 100420006 B1 | 2/2004 | |
| KR | 1020040096209 A | 11/2004 | |
| KR | 1020050006322 A | 1/2005 | |
| KR | 1020050006323 A | 1/2005 | |
| KR | 1020060087631 A | 8/2006 | |
| KR | 1020060087647 A | 8/2006 | |
| KR | 1020060087662 A | 8/2006 | |
| KR | 1020060088136 A | 8/2006 | |
| KR | 1020080066216 A | 7/2008 | |
| KR | 1020090025672 A | 3/2009 | |
| KR | 1020090097057 A | 9/2009 | |
| KR | 100927601 B1 | 11/2009 | |
| KR | 1020100007685 A | 1/2010 | |
| KR | 20100012724 A | 2/2010 | |
| KR | 20100112848 A | 10/2010 | |
| WO | 0045237 A2 | 8/2000 | |
| WO | 2010111097 A1 | 9/2010 | |

OTHER PUBLICATIONS

Meyer, et al., "On Floating-Point Normal Vectors", Computer Graphics Forum, vol. 29, No. 4, Jun. 1, 2010, 6 pages.

Munkberg, et al., "High Quality Normal Map Compression", Proceedings of the 21st ACM Siggraph/Erographics Symposium on Graphics Hardware, Sep. 4, 2006, 8 pages.

"Entropy encoding", Wikipedia, the free encyclopedia, retrieved from https://en.wikipedia.org/wiki/Entropy_encoding, Apr. 11, 2016, 1 page.

"Quantization", Wikipedia, the free encyclopedia, retrieved from https://en.wikipedia.org/wiki/Quantization, Apr. 11, 2016, 1 page.

Gandoin, et al., "Progressive lossless compression of arbitrary simplicial complexes", ACM Transactions on Graphics (TOG), Jul. 23, 2002, pp. 372-379.

Gumhold, et al., "Predictive point-cloud compression", ACM SIGGRAPH 2005 Sketches, Jul. 31, 2005, 1 page.

Huang, et al., "Octree-Based Progressive Geometry Coding of Point Clouds", SPBG Jul. 29, 2006: 103110, Jul. 29, 2006, pp. 103-110.

Merry, et al., "Compression of dense and regular point clouds", Computer Graphics Forum, Dec. 1, 2006, pp. 709-716.

Waschbüsch, et al., "Progressive compression of point-sampled models", Eurographics symposium on point-based graphics, Jun. 2, 2004, pp. 95-102.

Alliez, et al., "Progressive compression for lossless transmission of triangle meshes", Proceedings of the 28th annual conference on Computer graphics and interactive techniques, 2001, 8 pages.

Schnabel, "Octree-based Point-Cloud Compression", Eurographics Symposium on Point-Based Graphics, 2006, 11 pages.

"A Rational Parameterization of the Unit Circle", Leaves of Math, retrieved on Aug. 26, 2016 from https://mathnow.wordpress.com/2009/11/06/a-rational-Parameterization-of-the-Unit-Circle/, Nov. 6, 2009, 4 pages.

Isenburg, "Compression and Streaming of Polygon Meshes", dissertation, retrieved on Jul. 14, 2016 from http://cs.unc.edu/newspublications/doctoral-dissertations/abstracts-a-l/#Isenburg, 2005, 217 pages.

Narkowicz, "Octahedron normal vector encoding", retrieved on Aug. 26, 2016 from https://knarkowicz.wordpress.com/2014/04/16/octahedron-normal-vector-encoding/, Apr. 16, 2014, 9 pages.

* cited by examiner

|  | Naive | Periodic Tiling | | Inverted Tiling | |
|---|---|---|---|---|---|
|  | bytes | bytes | reduction | bytes | reduction |
| Bunny | 35966 | 34523 | 4.01% | 34677 | 3.58% |
| Buddha | 708903 | 681373 | 3.88% | 682386 | 3.74% |
| Boston XL | 5246916 | 5001216 | 4.68% | 4980349 | 5.08% |

FIG. 11

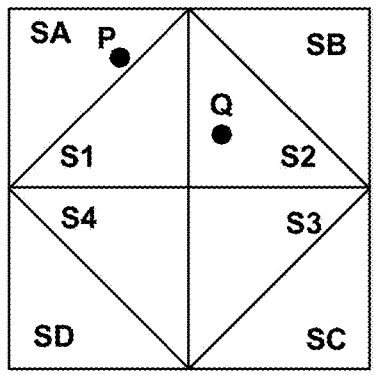 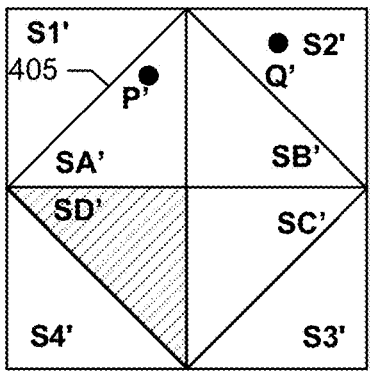 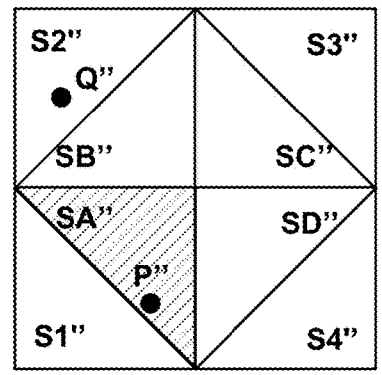
FIG. 15A   FIG. 15B   FIG. 15C
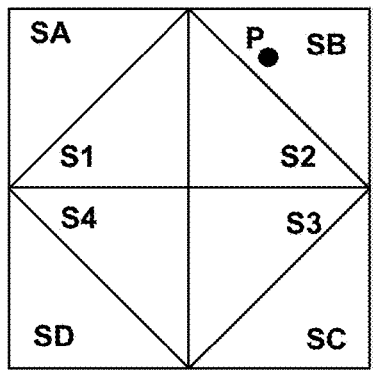 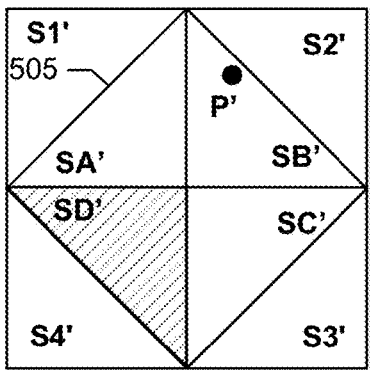 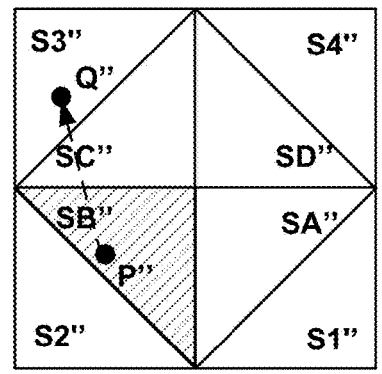
FIG. 16A   FIG. 16B   FIG. 16C
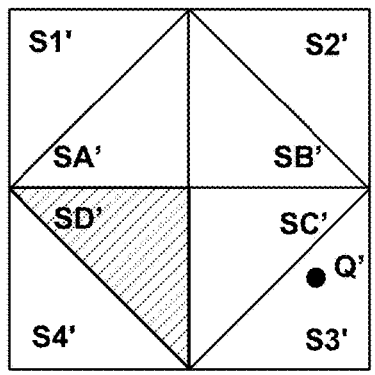 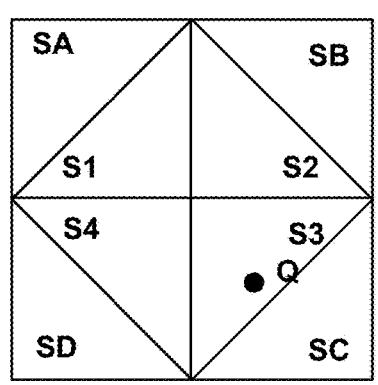
FIG. 16D   FIG. 16E

|  | Naive | Periodic Tiling | | Inverted Tiling | | Baselined Inverted Tiling | |
|---|---|---|---|---|---|---|---|
|  | bytes | bytes | reduction | bytes | reduction | bytes | reduction |
| Bunny | 33552 | 32810 | 2.211% | 32832 | 2.146% | 32829 | 2.155% |
| Buddha | 700112 | 682473 | 2.52% | 683445 | 2.38% | 682903 | 2.46% |
| Boston XL | 5017523 | 4940503 | 1.54% | 4922339 | 1.90% | 4916249 | 2.02% |

FIG. 17

METHODS AND APPARATUS TO ENCODE AND/OR DECODE NORMALS OF GEOMETRIC REPRESENTATIONS OF SURFACES

CROSS-REFERENCE TO RELATED APPLICATION

This application is a continuation-in-part of U.S. application Ser. No. 15/297,801, filed on Oct. 19, 2016, the contents of which are incorporated by reference herein.

FIELD OF THE DISCLOSURE

This disclosure relates generally to geometric representations of surfaces, and, more particularly, to methods and apparatus to encode and/or decode normals of geometric representations of surfaces.

BACKGROUND

The surface of a real or computer-generated object can be represented by geometric shapes, such as triangles, that form a piecewise planar approximation of the surface. The geometric shapes collectively form a geometric representation of the surface. Triangles can be defined by three vertices, and a normal, which is a vector that is normal to the plane formed by the triangle. In some examples, a normal can be at a vertex. In some instances, interpolation is used to determine normals that vary gradually across a surface.

Normals may also be attached to points in point clouds to provide shading.

SUMMARY

Methods and apparatus to encode and/or decode normals of geometric representations of surfaces are disclosed herein. An example method includes receiving a plurality of points, each point of the plurality of points representing a normal to the surface and being arranged within a tile; generating a plurality of regions within the tile, each of the plurality of regions including points of the plurality of points; retrieving a first point and a second point of the plurality of points, the first point representing a first normal to the surface and the second point representing a second normal to the surface, the first point being outside of a specified baseline region; performing a point transformation operation on the first point to produce a transformed first point of the baseline region and performing the point transformation on the second point to produce a transformed second point; generating a difference between the transformed first point and the transformed second point to produce a difference value; and encoding the difference value to produce an encoded difference value.

BRIEF DESCRIPTION OF THE DRAWINGS

FIG. 11 is a table showing example compression gains that may be achieved using the example methods disclosed herein.

FIG. 15A is a diagram illustrating an example tile derived from the geometric shape illustrated in FIG. 3 and containing prediction and actual points for the encoding of normals within the electronic environment illustrated in FIG. 12.

FIG. 15B is a diagram illustrating an example inversion operation that places the prediction point within an inner region during the encoding of the normal as illustrated in FIG. 15A.

FIG. 15C is a diagram illustrating an example point transformation operation that places the prediction point within a baseline region within the tile illustrated in FIG. 15A-15B.

FIG. 16A is a diagram illustrating an example tile derived from the geometric shape illustrated in FIG. 3 and containing a prediction point for the decoding of normals within the electronic environment illustrated in FIG. 12.

FIG. 16B is a diagram illustrating an example inversion operation that places the prediction point within an inner region during the decoding of the normal as illustrated in FIG. 16A.

FIG. 16C is a diagram illustrating an example point transformation operation that places the prediction point within a baseline region within the tile illustrated in FIG. 16A-16B.

FIG. 16D is a diagram illustrating an example inverse point transformation operation on an actual point derived from the prediction point in the baseline region in FIG. 16C.

FIG. 16E is a diagram illustrating an example inversion operation on an actual point in FIG. 16C.

FIG. 17 is another table showing example compression gains that may be achieved using the example methods disclosed herein.

DETAILED DESCRIPTION

Figure 1:
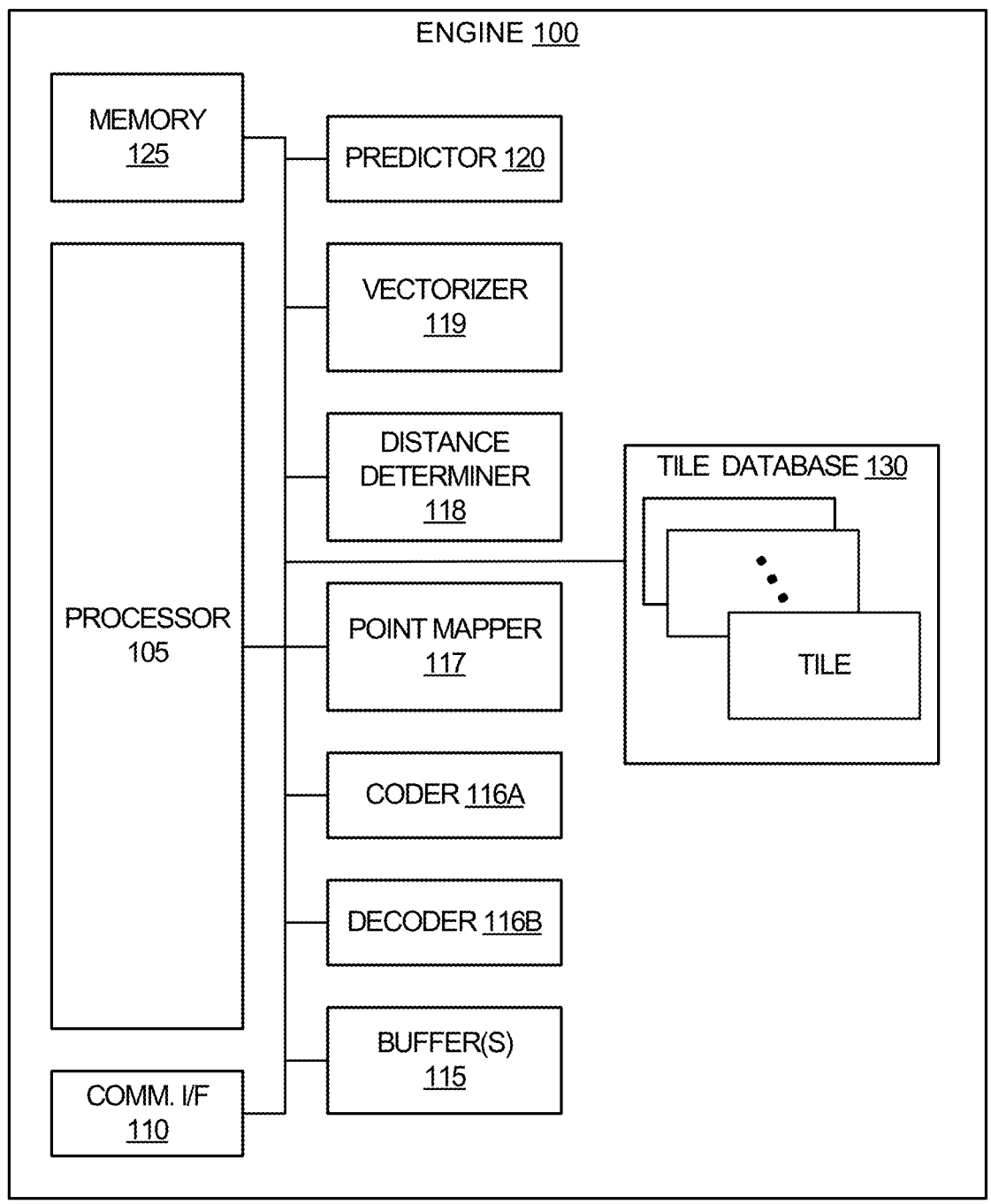
FIG. 1 is a schematic diagram that illustrates an example engine in accordance with the teachings of this disclosure.

Reference will now be made in detail to non-limiting examples of this disclosure, examples of which are illustrated in the accompanying drawings. The examples are described below by referring to the drawings, wherein like reference numerals refer to like elements. When like reference numerals are shown, corresponding description(s) are not repeated and the interested reader is referred to the previously discussed figure(s) for a description of the like element(s).

I. General Discussion

A geometric shape (e.g., an octahedron) may be used to represent normals of a surface. The geometric shape can be transformed into an at least partially flattened form for ease of computation. Consider an octahedron; it can be flattened with low distortion into a square by cutting one tip and the four edges adjoining the tip. The flattened shape will have four inner triangles (or areas, portions, regions, etc.) S1-S4 corresponding to the four surfaces the uncut half of the octahedron, and four outer triangles SA-SD corresponding to the four surfaces of the cut half of the octahedron (e.g., see FIG. 7A). A downside of this approach is that some points on adjacent surfaces (e.g. SA and SB) of the original octahedron become further apart after the octahedron is flattened, because their shared boundary has been cut. This increase in distance unfairly penalizes points that occur in the cut portion of the octahedron. Such penalties reduce the amount of entropy encoding that can be realized using the flattened geometric shape.

Example composite tiles and tile assemblies are disclosed that reverse this location dependent unfairness in the distance between points. The examples disclosed herein can ensure that the distance between a pair of points does not depend on where the points are located. For example, are they on the cut or uncut portion of the octahedron? By maintaining the correct distances between points, increases can be gained in the entropy encoding beyond that realizable using the flattened octahedron. Such gains come alongside the computational and ease of implementation gains arising from use of a flattened form.

FIG. 1 is a schematic diagram of an example engine 100 having a processor 105, a network interface 110, and a plurality of components 115-119. The engine 100 can include a coder 116A and/or a decoder 116B. When the engine 100 includes the coder 116A, the engine 100 can encode normals of geometric representations of surfaces. When the engine 100 additionally or alternatively includes the decoder 116B, the engine 100 can decode encoded normals of geometric representations of surfaces. Some or all of the components 115-119, together or in combinations, may be implemented by machine-readable instructions executed by the processor 105.

The example processor 105 of FIG. 1 can be in the form of a microcontroller, a central processing unit (CPU), an ASIC, a digital signal processor (DSP), an FPGA, a graphics processing unit (GPU), etc. programmed or configured to execute machine-readable instructions stored in memory 125. The instructions, when executed, cause the processor 105 and/or the components 115-119 to, among other things, control the engine 100 to encode and/or decode normals of geometric representations of surfaces. In some examples, more than one processor 105 and/or more than one memory 125 can be included in the engine 100. The engine 100 may be communicatively coupled to other devices (not shown) (e.g., to exchange data representing normals and encoded normals) via, for example, a communication interface (I/F) 110 that implements communication signals and/or protocols, such as Bluetooth®, Wi-Fi®, universal serial bus (USB), etc.

To store incoming and outgoing data, the example engine 100 of FIG. 1 includes any number and/or type(s) of buffers 115. When used to compress data, the example engine 100 of FIG. 1 includes any number and/or type(s) of coder 116A that performs, for example, Huffman, arithmetic, etc. entropy coding. When used to decompress data, the example engine 100 of FIG. 1 includes any number and/or type(s) of decoder 116B that performs, for example, Huffman, arithmetic, etc. entropy decoding. When the engine 100 is used to compress and decompress data, both the coder 116A and decoder 116B are included in the engine 100.

To map data points to one or more tiles, such as those described below in connection with FIGS. 2A, 7A and 7B, the example engine 100 includes a point mapper 117. To determine distances between at least points on one or more tiles, the example engine 100 includes a distance determiner 118. To determine one or more vectors between points on one or more tiles, the example engine 100 includes a vectorizer 119.

The example engine 100 of FIG. 1 will now be described in further detail with reference to FIGS. 2A-B, 3, 4, 5, 6, 7A-C, 8A-C, 9 and 10.

Figure 2A:
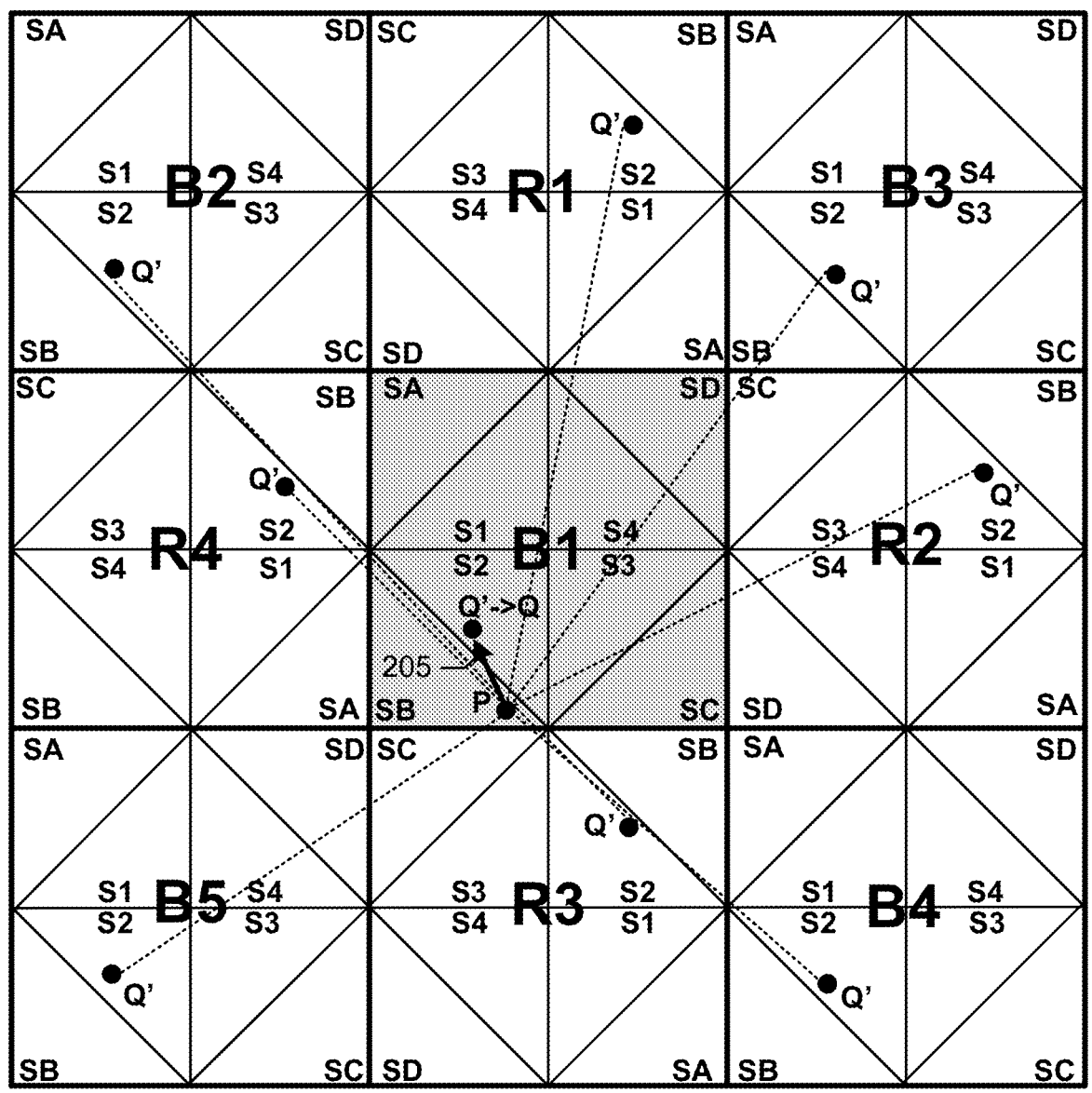
FIG. 2A illustrates an example composite tile, and an example encoding of a normal using the composite tile.

Turning first to FIG. 2A, an example composite tile 200 having tiles B1-B5 and tiles R1-R4 is shown. The tiles B1-B5 will be referred to herein as base tiles. The tiles B2-B5 are instances of the tile B1. The base tiles B1-B5 have inner triangular regions S1, S2, S3 and S4 arranged clockwise starting with the inner upper-left; and outer triangular regions SA, SB, SC, SD arranged clockwise starting with the outer upper-left. In examples described herein, the tiles R1-R4 are instances of the base tile rotated by 180 degrees. The tiles R1-R4 will be referred to herein as rotated tiles. Thus, the rotated tiles R1-R4 have inner triangular regions S3, S2, S1 and S4 arranged clockwise starting with the inner upper-left; and outer triangular regions SC, SB, SA, SD arranged clockwise starting with the outer upper-left. As shown, the tiles B1-B5, R1-R4 are tiled in a periodic arrangement. The base tile B1 and the rotated tile R1 are stored in a tile database 130 (see FIG. 1). The other tiles are instances of respective ones of the tile B1, and the tile R1.

In the example composite tile 200, nine tiles are used so that, for instance, a point near the cut tip of the octahedron can retains its short distance to a point on a nearby surface. For example, consider a point in the lower-left corner of base tile B1, it remains close to points in the lower-right corner of rotated tile R4, the upper-right corner of base tile B5, and the upper-left corner of rotated tile R3. The example tiles described herein have 8 triangular regions arranged in a square. If other geometric shapes are used, regions and/or tiles may have different shapes and, thus, the arrangement and number of necessary tiles may change.

Normals may be assumed to be normalized, that is, have length of one. In some implementations, the normal may not be normalized. Assuming normals are of unit length, they can be expressed with two dimensions on the surface of a unit sphere.

Figure 3:
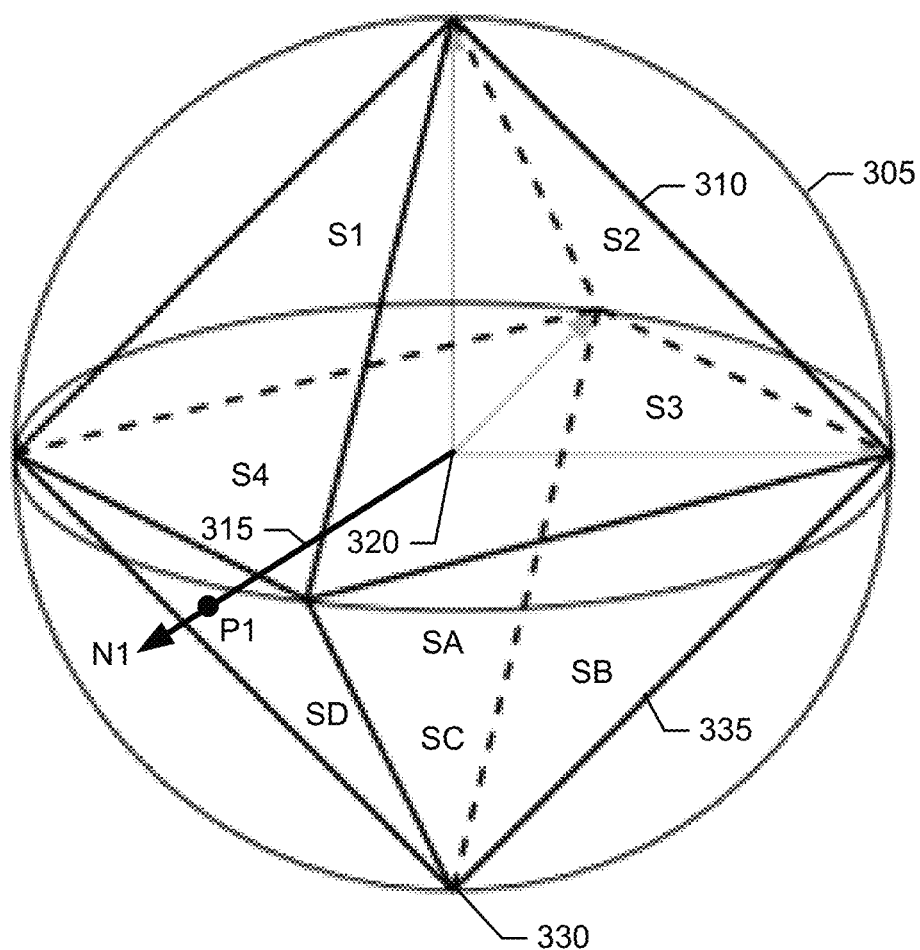
FIG. 3 illustrates an example geometric shape having surfaces used to define the example composite tile of FIGS. 2A-2B.

FIG. 3 illustrates an example of a unit sphere 305. Points on the unit sphere 305 can be expressed with two values. The two values can be determined using a variety of methods, such as, by evaluating trigonometric functions, rational parameterizations of a circle, etc. Another method can include inscribing a geometric shape, e.g., an octahedron 310, into the unit sphere 305. A vector 315 from the center 320 of the sphere 305 defines the direction of a normal N1. The point P1 where the vector 315 intersects a surface of the octahedron 310 represents the normal N1. For each normal, the center 320 of the sphere 305 is logically placed at the origin of the normal N1 and then used to determine the two values representing the intersection of the normal N1 with the octahedron 310. Although not shown, other geometric shapes may be used. In general, an exemplary shape provides for ease of mapping (e.g., low computational complexity) of points on the sphere 305 to points on the shape, and points on the shape to points on a transformed representation of the shape that facilitates tiling and/or transformation (e.g., inversion) as disclosed herein. The octahedron shape disclosed herein is merely one example of a shape having these properties. Any methods, algorithms, logic, circuits, etc. may be used to map a point on the unit sphere 305 to a point on a transformed representation of a shape.

The surface of the octahedron 310 can be parameterized with a unit square with little distortion. The octahedron 310 shown in FIG. 3 has 8 surfaces S1-S4 and SA-SD. The surfaces S1-S4 represent the top half of the octahedron 310, and the surfaces SA-SD represent the bottom half of the octahedron 310.

The surfaces S1-S4, SA-SD of the octahedron 310 can be mathematically rearranged into an at least partially planar surface. Conceptually, the octahedron 310 can be cut open at its lower tip 330 and along its 4 lower edges (one of which is designated at reference numeral 335), which then form the boundaries of the base tile B1. Referring also to FIG. 2A, the base tile B1 represents a planar unit square, where each triangle S1 through S4, and SA through SD of the base tile B1 represents a corresponding surface S1 through S4, and SA through SD of the octahedron 310. In the example of FIGS. 2A and 3, the inner triangles S1-S4 correspond to the upper surfaces S1-S4 of the octahedron 310 and the outer triangles SA-SD correspond to the lower surfaces SA-SD of the octahedron 310. However, that convention could be reversed. For instance, the inner triangles could correspond to the lower surfaces, and the outer triangles could correspond to the upper surfaces. In some implementations, the triangles can be referred to as portions of a tile. In some examples, the triangles can be referred to as regions of a tile.

II. Periodic Tiling

A benefit of the tile arrangement of FIG. 2A is that a first point in, for example, triangle SB in tile B1 may be closer to a second point in triangle SA in tile R4 than to a third point corresponding to the second point in triangle SA in tile B1. Thus, a first vector between the first point in triangle SB in tile B1 and the second point in triangle SA in tile R4 is shorter than a second vector between the first point in triangle SB in tile B1 and the third point in triangle SA in tile B1 due to the arrangement of tile R4 next to tile B1. Accordingly, the second point in triangle SA in tile R4 which is closest to the first point in triangle SB in tile B1 can be selected and used. Use of only the base tile B1 without the other tiles results in the lower triangles SA-SD being penalized when vectors cross between lower triangles SA-SD. Use of the example composite tile 200 of FIG. 2A enables lower triangles SA-SD to be treated equally with upper triangles S1-S4 because lower triangles SA-SD are now adjacent to lower triangles SA-SD in adjacent tiles.

In some examples, a predicted point P, and a difference vector between the predicted point P and an actual point Q where the normal intersects the octahedron 310 are used to represent a normal. In some examples, the points P and Q are received by the engine 100 via the communication interface 110. In some examples, a predictor 120 determines the point P. The point P may be determined using any number and/or type(s) of algorithms, methods, circuits, processors, etc. For example, the most recent point Q could be used as the point P for the next normal vector, using past points Q to predict the point P for the next normal vector (e.g., for smoothly varying surfaces), the decoded geometric normal of a surface, an average normal of adjacent surfaces, etc. The points P are known to both an encoder and a decoder receiving encoded data from the encoder.

Referring to FIG. 2A, the point mapper 117 maps a predicted point P into triangle SB in the base tile B1, and an actual point Q into triangle S2 of each of the tiles B1-B5, R1-R4 as points Q'. The points Q' correspond with the actual point Q, but are in tiles having different orientations. Points in different tiles are said to correspond if they are located at the same locations in their respective tile. For example, in FIG. 2A, the points Q' are all in the triangles S2 about halfway along the shared line with triangle SB, and all represent the same normal.

The coordinates of the points P, P', Q, and Q' may be quantized (e.g., represented using fixed point numbers), or may be un-quantized (e.g., represented using floating point numbers). In some examples, the coordinates of the points P and Q are received as fixed point numbers. In some examples, the coordinates of the points P and Q are received as floating point numbers and quantized during determining of normal vectors.

The distance determiner 118 determines the distances from the predicted point P to each of the points Q'. The distance determiner 118 identifies the point Q' having the shortest distance to the predicted point P. In the example of FIG. 2A, the point Q' closest to the predicted point P is the point Q' in triangle S2 of the base tile B1. Accordingly, the point Q' in triangle S2 of the base tile B1 is selected to be the point Q to be used to determine a difference vector 205. In some examples, outer portions of the tiles B2-B5, R1-R4 are not considered.

Figure 2B:
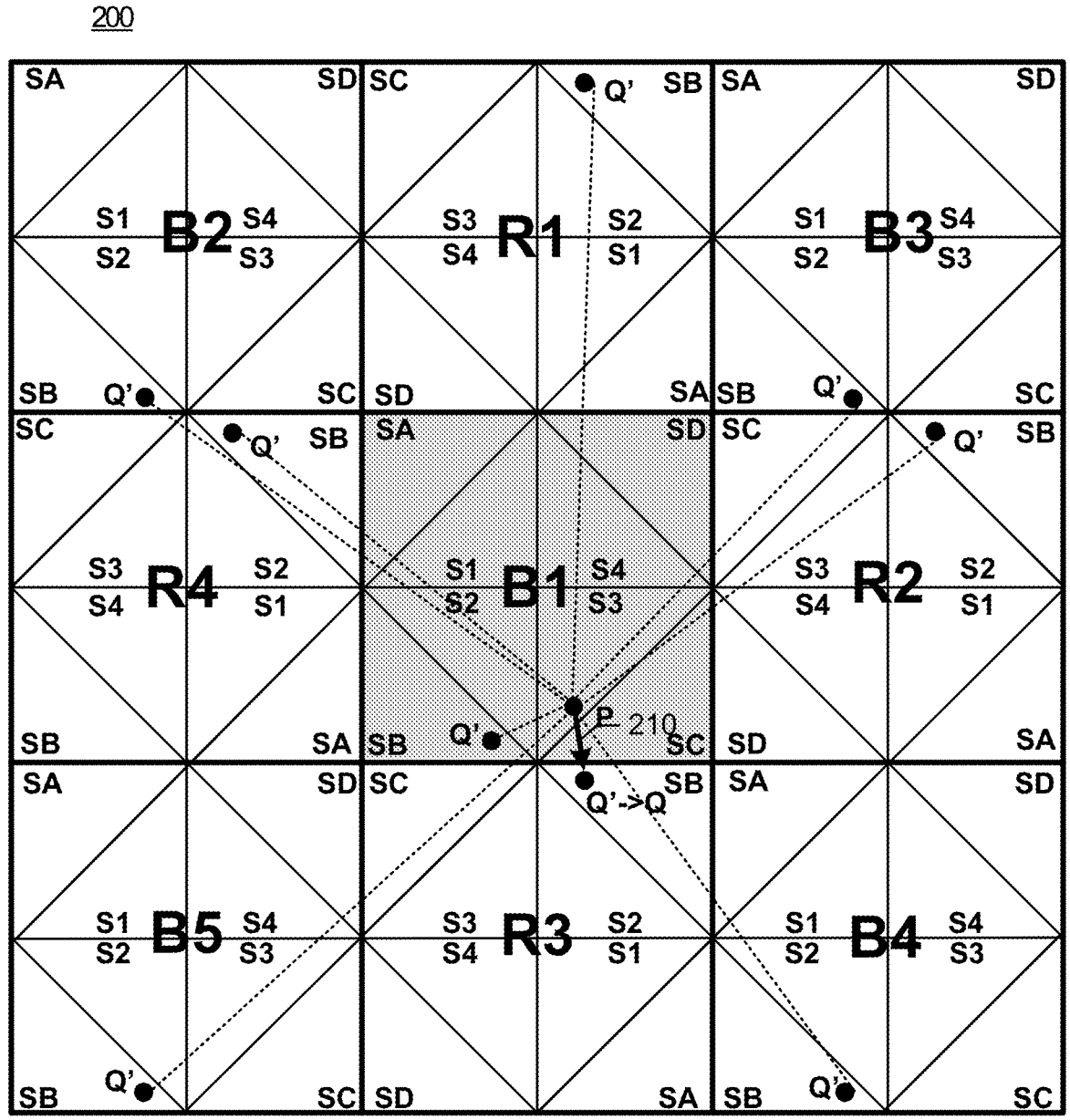
FIG. 2B illustrates another example encoding of a normal using the composite tile of FIG. 2A.

The vectorizer 119 determines the difference vector 205 between the point P and the selected point Q. The vectorizer 119 determines two parameters (e.g., X and Y) that express the difference vector 205. Like, the P, P', Q and Q' points, the parameters (e.g., X and Y) representing the difference vector 205 may be quantized numbers, or un-quantized numbers. In practice, the parameters X and Y represent an approximation of the difference vector 205. The approximation can be more or less accurate depending on the mathematical precision used to represent P, Q, X and Y. In some instances, the parameters X and Y may accurately represent the difference vector 205. The vectorizer 119 stores the parameters in the buffer 115. At intervals, the outgoing contents of the buffer 115 are entropy coded (e.g., compressed) by the coder 116A to reduce the number of bits required to represent the difference vector parameters stored in the buffer 115. The entropy encoder 116A can provide more compression when the buffer 115 stores values that repeat more often, e.g., with high frequency. Which is why it is advantageous to aim for shorter difference vectors, as this causes a higher probability for small coordinate values to repeat. In another example shown in FIG. 2B, the point mapper 117 maps a predicted point P into the triangle S3 of the base tile B1, and the actual point Q into the triangles SB of the tiles B1-B5 and R1-R4 as point Q'. The distance determiner 118 determines the distances from the predicted point P to each of the points Q', and identifies the point Q' having the shortest distance to the predicted point P. In the example of FIG. 2B, the point Q' closest to the predicted point P is included in rotated tile R3. The point Q' is selected as the point Q to be used to determine a difference vector 210. The vectorizer 119 determines the difference vector 205 between the point P and the selected point Q. The vectorizer 119 determines two parameters (e.g., X and Y) that express the difference vector 205. The vectorizer 119 stores the parameters in the buffer 115. At intervals, the outgoing contents of the buffer 115 are entropy coded (e.g., compressed) by the coder 116A to reduce the number of bits to represent the difference vector parameters stored in the buffer 115.

Figure 4:
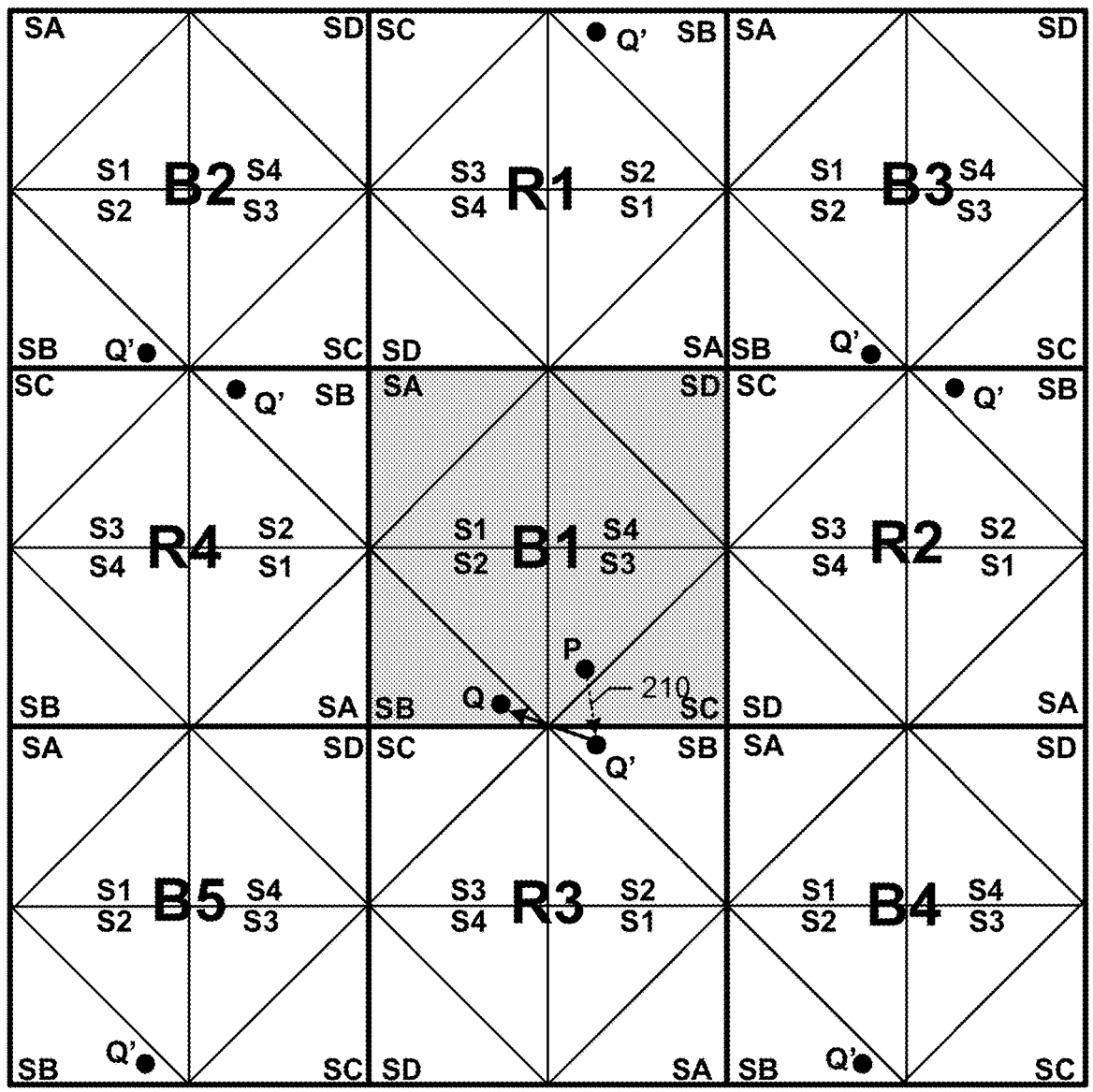
FIG. 4 illustrates an example decoding of an encoded normal using the example composite tile of FIGS. 2A-2B.

Turning to FIG. 4, an example decoding of the example normal of FIG. 2B is shown. Predicted point P values and encoded difference vectors are stored in the buffer 115. At intervals, encoded difference vectors in the buffer 115 are entropy decoded (e.g., decompressed) by the decoder 116B to obtain difference vectors. For a point P and a decoded difference vector (e.g., the point P and difference vector 210 of FIG. 2B), the point mapper 117 maps the predicted point P to triangle S3 of the base tile B1. The vectorizer 119 uses the difference vector 210 and the predicted point P to determine a point Q'. If the point Q' is disposed in the base tile B1, the point Q' is taken as the decoded actual point Q. If the point Q' is disposed outside the base tile B1, as shown in FIG. 4, the point Q in triangle SB of the base tile B1 corresponding to the point Q' is selected as the decoded point Q. The decoded point Q may be output and/or stored in the buffer 115. In practice, the decoded point Q represents an approximation of the original point Q of an encoded normal vector. The approximation can be more or less accurate depending on the mathematical precision used to represent the difference vector 210 and the point P. In some instances, the point Q can be accurately recovered.

Figure 5:
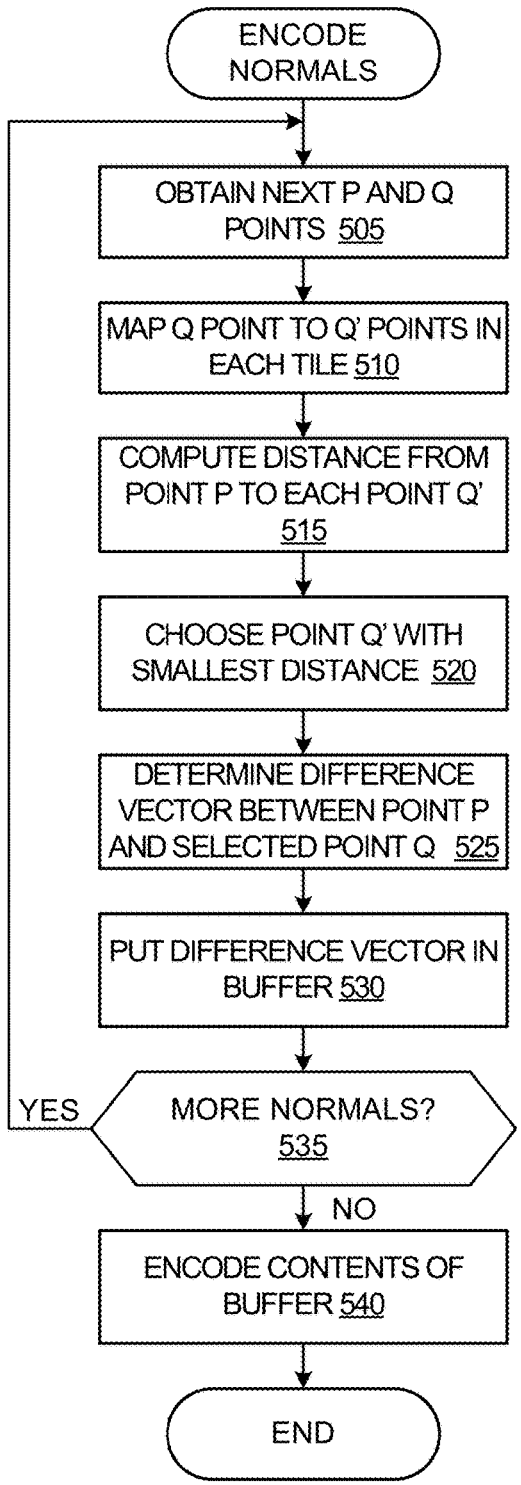
FIG. 5 is a flowchart representing an example method that may be used to encode a normal using the example composite tile of FIGS. 2A-2B.
Figure 12:
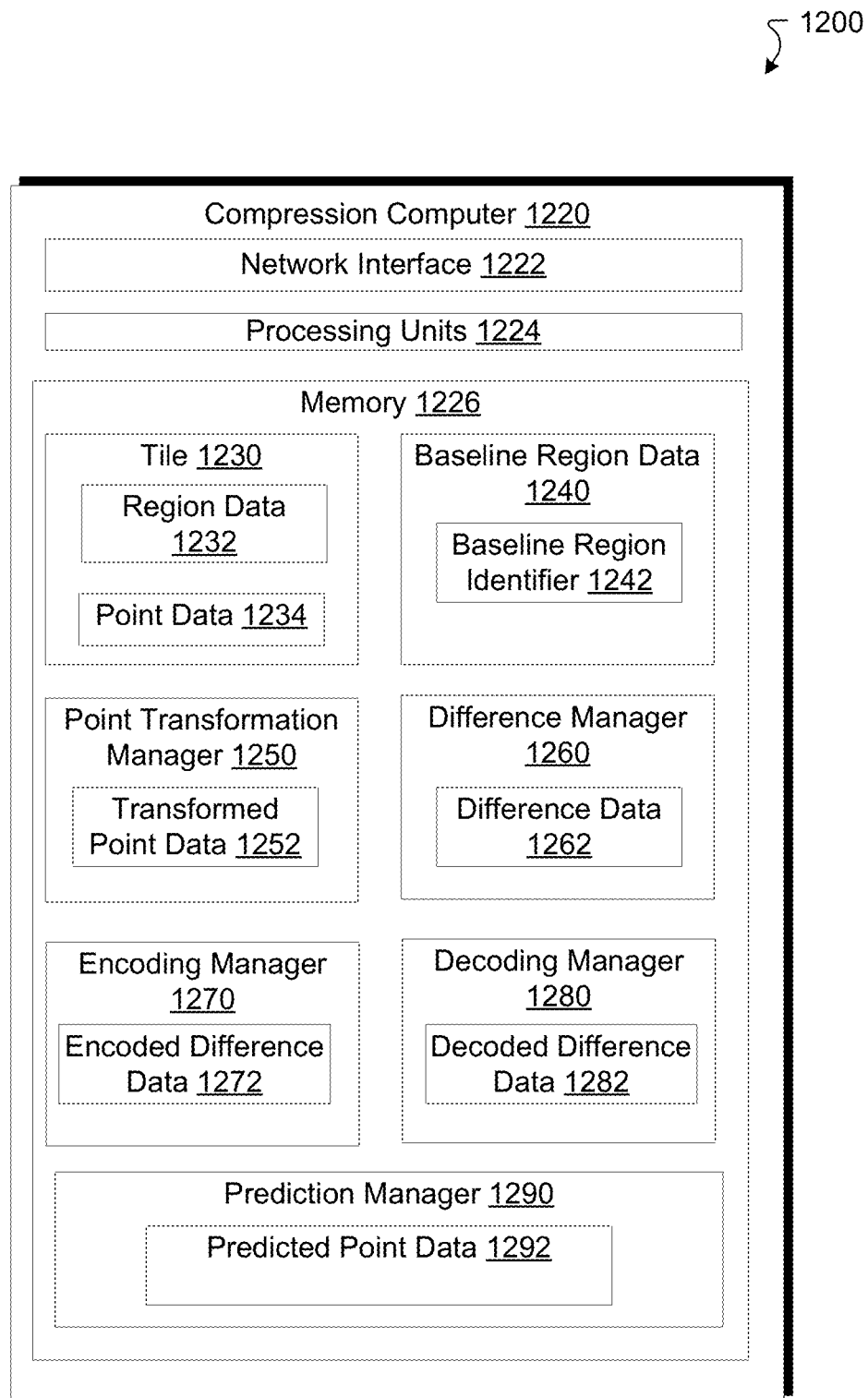
FIG. 12 is a schematic diagram that illustrates an example electronic environment in which improved techniques of encoding and/or decoding normals of geometric representations of surfaces are performed in accordance with the teachings of this disclosure.

FIG. 5 is a flowchart of an example method that may be performed to encode normals using the example composite tile 200 of FIG. 2A. The example method may be implemented by the example engine 100 of FIG. 1 and/or as machine-readable instructions performed by one or more processors, such as the example processors 105 (FIG. 1), and P00 and P50 (FIG. 12).

The example method of FIG. 5 includes obtaining a predicted point P and an actual point Q for a normal via, for example, the communication interface 110 (block 505). The point mapper 117 maps the predicted point P to the base tile B1, and the actual point Q to a point Q' in each of the tiles B1-B5 and R1-R4 (block 510). The distance determiner 118 computes distances between point P and each of the points Q' (block 515). The distance determiner 118 selects the point Q' having the shortest distance as point Q (520). The vectorizer 119 determines the difference vector between the point P and the selected point Q (block 525). The difference vector is placed in the buffer 115 for subsequent coding (e.g., compression) (block 530). When all normals have been processed (block 535), contents of the buffer are entropy encoded by the coder 116A (block 540), and control exits from the example method of FIG. 5.

Figure 6:
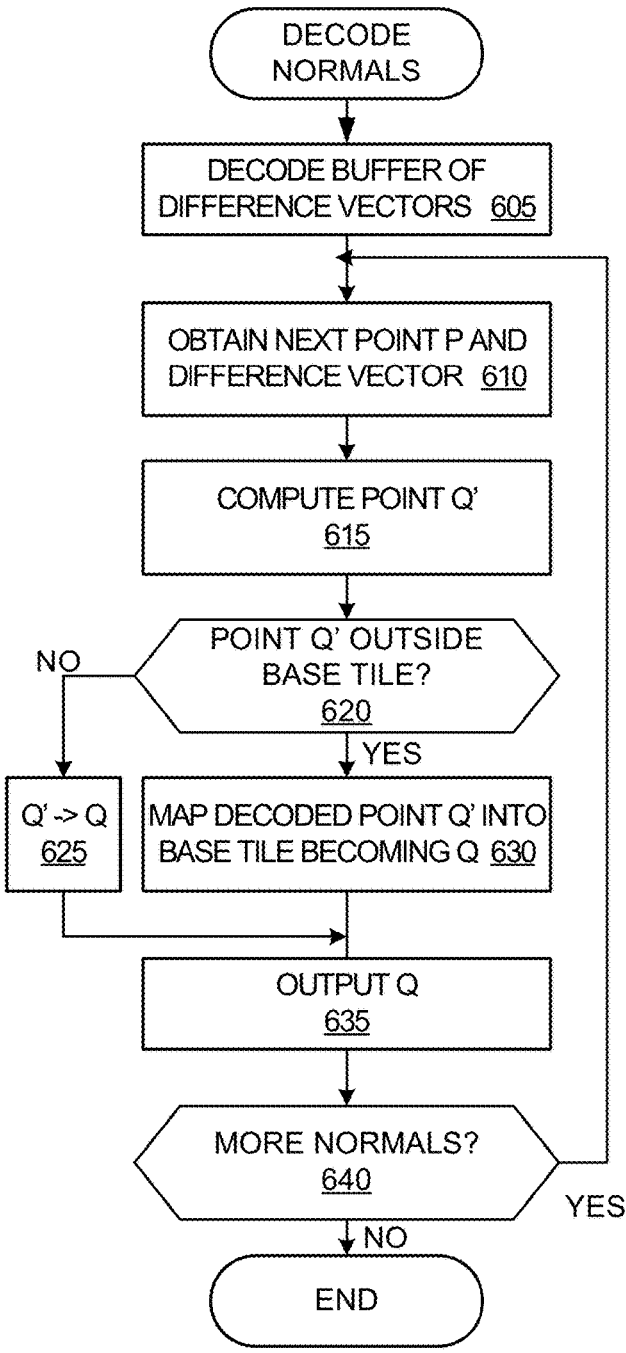
FIG. 6 is a flowchart representing an example method that may be used to decode an encoded normal using the example composite tile of FIGS. 2A-2B.

FIG. 6 is a flowchart of an example method that may be performed to decode normals using the example composite tile 200 of FIG. 2A. The example method may be implemented as machine-readable instructions performed by one or more processors, such as the example processors 105 (FIG. 1), and P00 and P50 (FIG. 12).

The example method of FIG. 6 includes the decoder 116B decoding a buffer 115 of difference vectors (block 605). A difference vector and predicted point P are extracted from the buffer (block 610). The vectorizer 119 uses the point P and the difference vector to determine a point Q' (block 615). If the point mapper 117 determines the point Q' is disposed in the base tile B1 (block 620), the point Q' is selected as the decoded point Q (block 625). If the point mapper 117 determines the point Q' is disposed outside the base tile B1 (block 620), the point Q' is mapped to a corresponding point Q in the base tile B1 (block 630). The point Q is output via the communication interface 110 (block 635). When all normals have been processed (block 640), control exits from the example method of FIG. 6.

III. Context-Sensitive Inverted Tiling

Figure 7A:
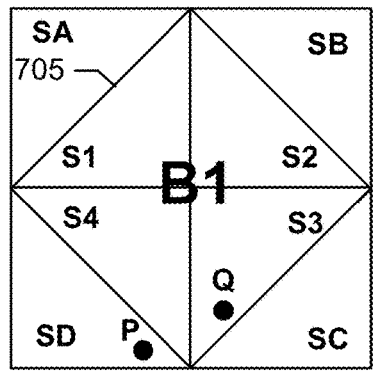
FIGS. 7A and 7B illustrate an example tile assembly, and an example encoding of a normal using the tile assembly of FIGS. 7A and 7B.
Figure 7B:
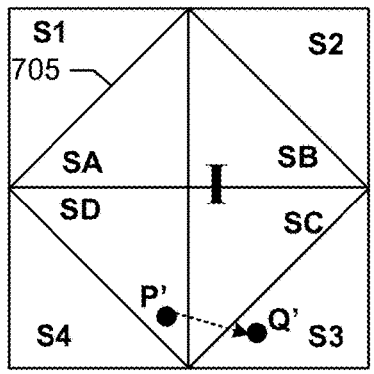
Figure 7C:
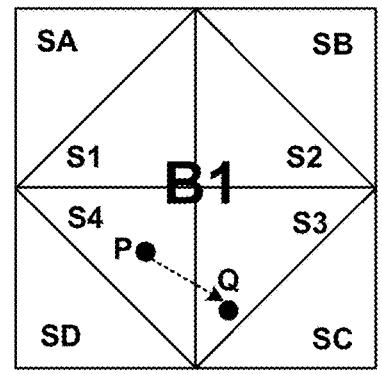
FIG. 7C illustrates another example encoding of a normal using the example tile assembly of FIGS. 7A and 7B.

FIGS. 7A-7C illustrate another example method of encoding normals. Recognizing that it is points that are disposed on the cut half of the octahedron that are penalized, FIGS. 7A-7C show an example tile assembly having two tiles, each being an inverted version of each other. Briefly, when a point is disposed on the uncut half of the octahedron, a first tile is used, the point is disposed on an inner triangle of the first tile. When a point is disposed on the cut half of the octahedron, a second tile which is inverted from the first tile, is used. Accordingly, this latter point is located on an inner triangle of the second tile, and will not be penalized for falling on the cut half of the octahedron. Which tile is used to encode a point, depends on where the predicted point falls on the octahedron. The encoded normal of FIGS. 7B and 7C can be decoded using the same normal tile, inverted tile pair. Only a pair of tiles is needed in this example, because there are only two halves of the octahedron that are considered. For other geometric shapes, the number of tiles and/or their constituents may change.

The example of FIGS. 7A-7C uses a group of tiles, for example, a pair of tiles B1 and I. The tile B1 is identical to the base tile B1 of FIG. 2A. The tile I is an inverted version of the tile B1. The inverted tile I is formed by mirroring corresponding inside and outside triangles (e.g., triangle A1 and triangle SA) along their shared diagonal 705. That is, in the tile B1, the surfaces S1 through S4 of the uncut half of the octahedron are used to form the inner triangular regions of the square, and the surfaces SA through SD of the cut half of the octahedron are used to form the outer triangular regions. In FIG. 7B, an opposite end of the octahedron is cut. In the tile I1, the surfaces S1 through S4 of the cut half of the octahedron are used to form the outer triangular regions of the square, and surfaces SA through SD of the uncut half of the octahedron are used to form the inner triangular regions. The tile B1 and the tile I may be stored in the tile database 130.

Using a predicted point P and an actual point Q, the point mapper 114 determines whether the predicted point P is disposed in one of the outer triangles SA-SD of the tile B1. If, as shown in FIG. 7A, the point P is disposed in an outer triangle SD of the tile B1, the point mapper 114 maps the point P to a corresponding point P' in the inverted tile I, and the point Q to corresponding point Q' in the inverted tile I, as shown in FIG. 7B. The vectorizer 119 determines the difference vector between the point P' and the point Q', and stores the difference vector in the buffer 115. FIG. 7C shows another example in which the point P is disposed in an inner triangle S4 of the base tile B1 and, thus, the vectorizer 119 determines the difference vector between the point P and the point Q within the base tile B1. As discussed above, the points P and Q may be quantized, and/or the difference vector may be an approximation. The point P may be determined by the predictor 120.

Figure 8A:
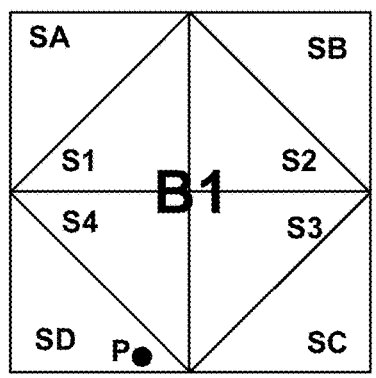
FIGS. 8A, 8B, and 8C illustrate an example decoding of an encoded normal using the example tile assembly of FIGS. 7A and 7B.
Figure 8B:
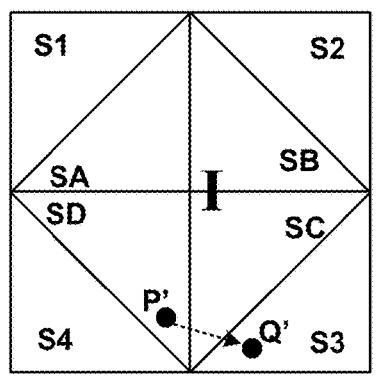
Figure 8C:
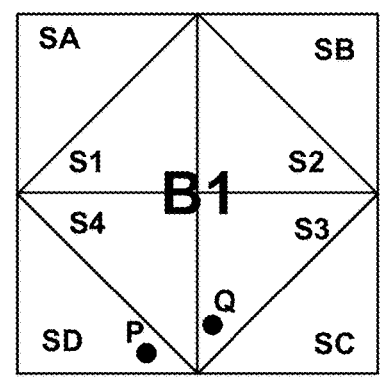

FIGS. 8A-8C illustrate an example decoding for the example encoding of FIGS. 7A and 7B. Like the example of FIGS. 7A-7C, the example decoding of FIGS. 8A-8C chooses a starting tile such that the prediction point P is disposed in an inner triangle of the starting tile. Decoding proceeds from the starting tile.

As shown in FIG. 8A, the predicted point P is disposed in an outer triangle SD of the base tile B1. Accordingly, as shown in FIG. 8B, the point mapper 114 maps the point P to a corresponding point P' in the inverted tile I. The vectorizer 119 uses a difference vector to determine an actual point Q', as shown in FIG. 8B. Because the predicted point P is disposed in an outer triangle SD of the base tile T1, the point Q' is mapped to its corresponding point Q in the base tile B1, as shown in FIG. 8C. As discussed above, the decoded point Q may be an approximation of the original point Q.

Figure 9:
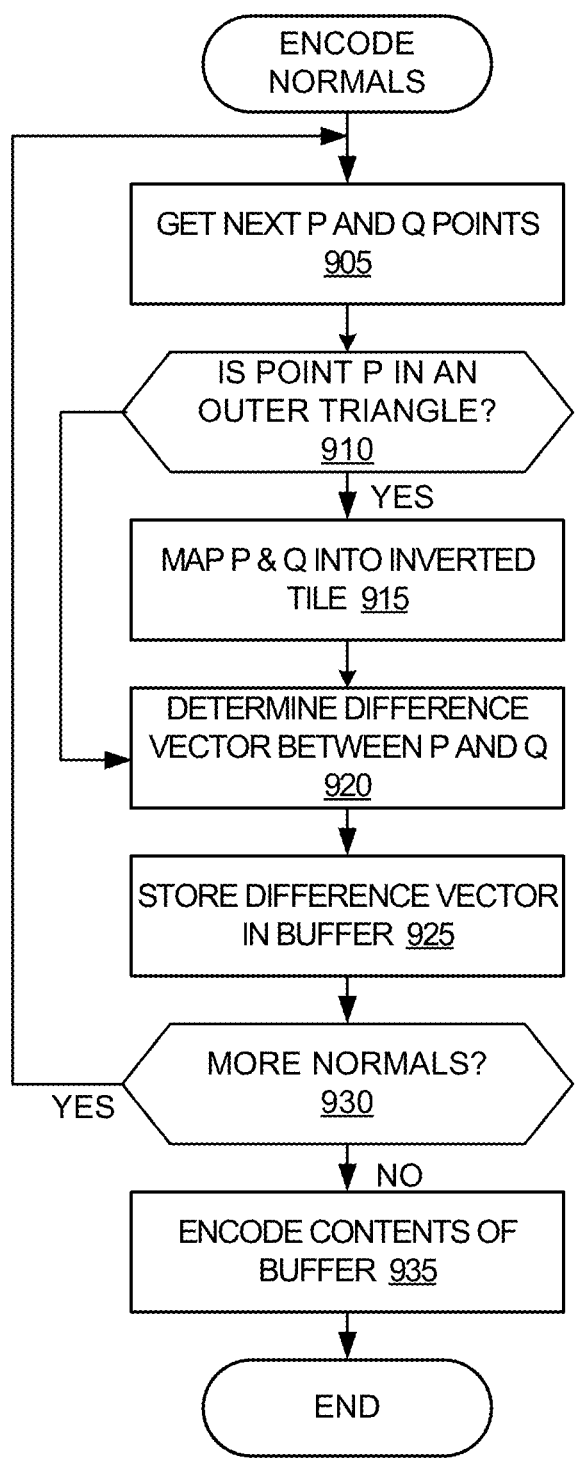
FIG. 9 is a flowchart representing an example method that may be used to encode a normal using the example tile assembly of FIGS. 7A-7B.

FIG. 9 is a flowchart of an example method that may be performed to encode normals using the example tile B1 (see FIG. 7A) and the inverted tile I (see FIG. 7B). The example method may, for example, be implemented as machine-readable instructions performed by one or more processors, such as the example processors 105 (FIG. 1), and P00 and P50 (FIG. 12).

The example method of FIG. 9 includes obtaining a predicted point P and an actual point Q via the communication interface 110 (block 905). If the point mapper 117 determines the point P is in an outer triangle of the base tile B1 (block 910), the point mapper 117 maps the point P to a corresponding point P' in the inverted tile I and maps the point Q to a corresponding point Q' in the inverted tile I (block 915). The vectorizer 119 determines a difference vector between the point P' and the point Q' (block 920).

Returning to block 910, if the point mapper 117 determines the point P is in an inner triangle of the base tile B1 (block 910), the vectorizer 119 determines a difference vector between the point P and the point Q (block 920). The difference vector is stored in the buffer 115. When all normals have been processed (block 930), the coder 116 entropy encodes the contents of the buffer (block 935), and control exits from the example process of FIG. 9.

Figure 10:
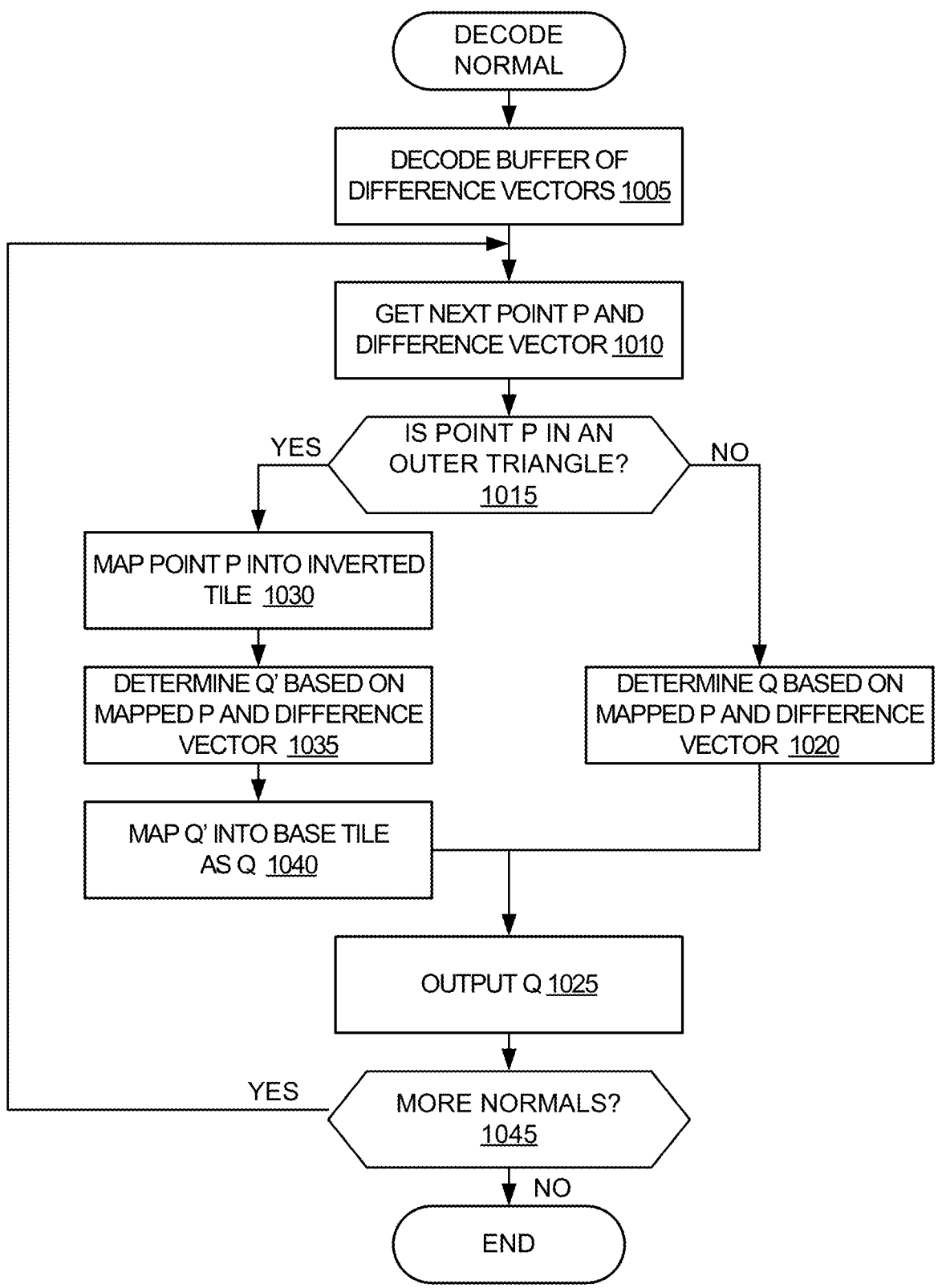
FIG. 10 is a flowchart representing an example method that may be used to decode an encoded normal using the example tile assembly of FIGS. 7A-7B.

FIG. 10 is a flowchart of another example method that may be performed, to decode normals using the example base tile B1 (see FIG. 7A) and the inverted tile I (see FIG. 7B). The example method may, for example, be implemented as machine-readable instructions performed by one or more processors, such as the example processors 105 (FIG. 1), and P00 and P50 (FIG. 12).

The example method of FIG. 10 includes the decoder 116B decoding a buffer 115 of encoded difference vectors (block 1005). For a predicted point P and a difference vector (block 1010), if the point mapper 117 determines the point P is in an inner triangle of the base tile B1 (block 1015), the vectorizer 119 determines the point Q is based on the point P and difference vector (block 1020), and the point Q is output via the communication interface 110 (block 1025).

Returning to block 1015, if the point mapper 117 determines the point P is in an outer triangle of the base tile B1 (block 1015), the point mapper 117 maps the point P to a corresponding point P' in the inverted tile I (block 1030). The vectorizer 119 determines the point Q' based on the point P' and the difference vector (block 1035), and the point Q is output via the communication interface 110 (block 1025).

When all normals have been processed (block 1045), control exits from the example process of FIG. 10.

FIG. 11 is a table showing example compression gains that may be obtained using the example methods disclosed herein. The table of FIG. 11 compares four compression methods: naïve correction encoding, the naive correction encoding, the periodic tiling of FIGS. 2A, 2B, 4, 5 and 6, and the inverted tiling of FIGS. 7A-C, 8A-C, 9 and 10. The table shows compression performance for the four methods for three models: the Stanford bunny, a Buddha, and an extra large (XL) model of Boston. In this comparison, the actual point Q for a normal is used as the predicted point P for the next normal. The table shows the number of bytes occupied by the normals. The table also shows the reduction in percentage (%) in the number of bytes yielded by each of the methods, for each of the three models. As shown, the methods disclosed herein provide meaningful improvements in compression of approximately 4% to 5% depending on the surface characteristics. For example, the Bunny and Buddha images have more surface direction variations, and the Boston XL image has more normals in the same direction.

IV. Transforming to a Baseline Region

As described previously, an inversion step may be performed to lower the entropy in a delta encoding scheme. In the encoding step, if a first point P (see, e.g., FIGS. 7A-7C) is located in an outer triangle, then an inversion step is performed to switch the inner and outer triangles. That is, the inversion is a mapping from a first, predicted point P in an outer triangle to a new point P' in an inner triangle. A second, actual point Q is then mapped to a transformed second point Q', and the difference Q'-P' is entropy encoded. That difference should be small if the delta encoding is to be considered satisfactory. In some cases, however, the delta encoding is not good and the range of differences can be large. This leads to a higher entropy encoding, which decreases the compression rate.

Improved techniques of encoding normals to a surface involve performing a transformation to move points within a tile that represent normals of a surface to a specified baseline region of the tile. Along these lines, a quantized set of points in a tile can represent the normals to a surface. The points in these tiles may be mapped to a solid, e.g., a regular octahedron, inscribed in the unit sphere. In the case of the octahedron, the regions of the tile are either inner triangles or outer triangles. A baseline region would be a particular inner triangle. For points initially in an outer triangle, it may be advantageous to perform an inversion operation as described previously to move a point into a corresponding inner triangle. A rotation is applied to that point to move the point (i.e., a prediction point) into the baseline region, e.g., the lower left inner triangle and the same rotation to another point (i.e., a actual point) close by. An advantage of the improved techniques can be that all quantized (e.g., long) actual points have positive component values. This reduces the possible range of correction component values significantly, which in turn reduces the entropy of encoding the differences.

A baseline region of the tile is a region to which the first point of every pair of points is moved by transformation. For example, for the octahedron encoding in which the regions of the flattened tile to which the octahedron faces map include four outer triangles and four inner triangles, a baseline region may be the inner lower-left triangle. In other implementations, a different inner triangle may be specified as the baseline region.

FIG. 12 is a diagram that illustrates an example electronic environment 1200 in which the above-described improved techniques may be implemented. As shown, in FIG. 12, the electronic environment 1200 includes a compression computer 1220.

The compression computer 1220 is configured to store information related to normals to a surface of a three-dimensional object, perform compression operations to reduce the burden of storing the information, and perform decompression operations to recover the information. Specifically, the compression computer 1220 is configured to perform a transformation to arrange points within a specified baseline region of that tile in order to reduce the possible range of differences between consecutive points to be delta encoded for compression.

The compression computer 1220 includes a network interface 1222, one or more processing units 1224, and memory 1226. The network interface 1222 includes, for example, Ethernet adaptors, Token Ring adaptors, and the like, for converting electronic and/or optical signals received from a network to electronic form for use by the point cloud compression computer 1220. The set of processing units 1224 include one or more processing chips and/or assemblies. The memory 1226 includes both volatile memory (e.g., RAM) and non-volatile memory, such as one or more ROMs, disk drives, solid state drives, and the like. The set of processing units 1224 and the memory 1226 together form control circuitry, which is configured and arranged to carry out various methods and functions as described herein.

In some embodiments, one or more of the components of the compression computer 1220 can be, or can include processors (e.g., processing units 1224) configured to process instructions stored in the memory 1226. Examples of such instructions as depicted in FIG. 1 include a point transformation manager 1250, a difference manager 1260, an encoding manager 1270, a decoding manager 1280, and a prediction manager 1290. Further, as illustrated in FIG. 1, the memory 1226 is configured to store various data, which is described with respect to the respective managers that use such data.

The point transformation manager 1250 is configured to apply a transformation to a point of the tile to the baseline region of the tile to produce transformed point data 1252. For example, in the case of octahedron encoding of the normals, the transformation may take the form of a rotation within the tile or a reflection of a point about an axis of symmetry of the tile. In some arrangements, the rotation may be 90 degrees, 180 degrees, or 270 degrees depending on the position of a point in the tile.

In some arrangements in the case of octahedron encoding of the normal described previously, a predicted point P may be in an outer triangle. In that case, then the point transformation manager 1250 is also configured to perform an inversion operation that maps that prediction point P to a point P' in an inner triangle, similar to the point mapper 117 as described previously.

The point transformation manager 1250 performs the same set of transformations on a actual point as performed on a prediction point. Thus, if there is an inversion performed on a prediction point, then there will be an inversion of the actual point as well. The point transformation manager 1250 also applies the same rotation to the actual point as the prediction point.

The difference manager 1260 is configured to produce difference data 1262 between a prediction point and a actual point after transformation as described above with regard to the point transformation manager 1250, similar to the vectorizer 119 as described previously. For points in the tile, i.e., point data 1234, each of the difference data 1262 has two components. Each component may then be expressed as a long integer having a specified number of bits (e.g., 8 bits). Because of the transformations performed by the point transformation manager 1250, the range of values of each of the components is, at worst, half of that achieved without any transformation.

The encoding manager 1270 is configured to encode the difference data 1262 to produce encoded difference data 1272, similar to the coder 116A as described previously. In some arrangements, the encoding manager 1270 uses an entropy encoder such as, e.g., arithmetic coding or Huffman coding to perform the encoding of the difference data 1262. Ideally, there is as little variation in the difference data 1262 as possible so that the encoded difference data 1272 has small entropy.

The decoding manager 1280 is configured to decode the encoded difference data 1272 to produce decoded difference data 1282, similar to the decoder 116B as described previously.

The prediction manger 1290 is configured to generate a predicted point 1292, denoted as P. The point P may be generated using any number and/or type(s) of algorithms, methods, circuits, processors, etc. For example, a most recent actual point Q could be used as a predicted point P for the next normal vector. In other examples, other previous actual points Q, the decoded geometric normal of a surface, an average normal of adjacent surfaces, etc., may be used to predict the point P for the next normal vector (e.g., for smoothly varying surfaces).

Figure 13A:
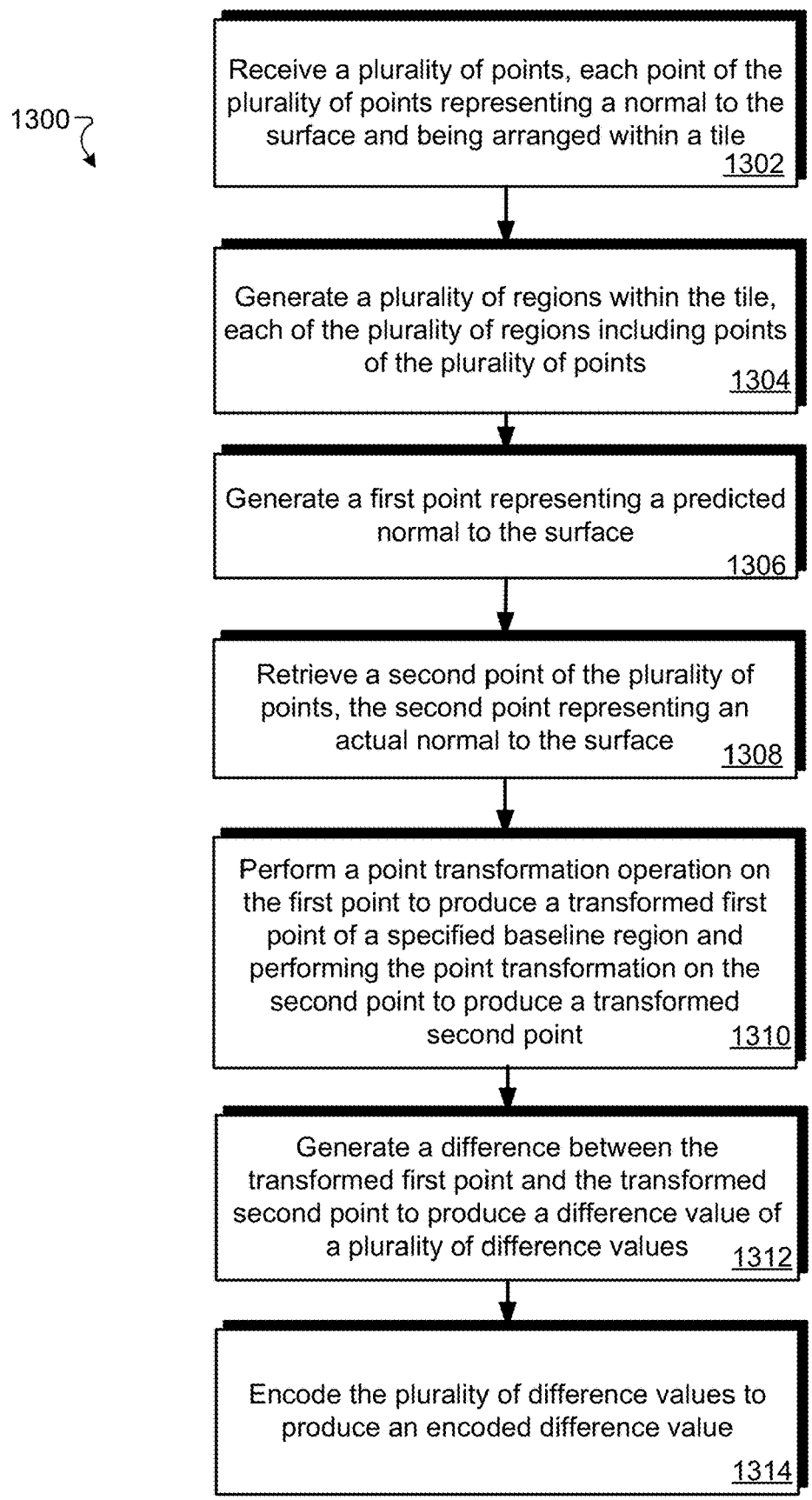
FIG. 13A is a flowchart illustrating an example method of performing the improved techniques within the electronic environment illustrated in FIG. 12.

FIG. 13A is a flowchart that illustrates an example method 1300 of encoding normals of a surface. The method 1300 may be performed by software constructs described in connection with FIG. 1, which reside in memory 1226 of the compression computer 1220 and are run by the set of processing units 1224.

At 1302, the compression computer 1220 retrieves a plurality of points. Each point of the plurality of points represents a normal to the surface and is arranged in a tile. The plurality of points lie on a grid whose spacing is determined by the bit length of the components of the points. Typically, the bit length is 8, but the length can be shorter or longer.

At 1304, the compression computer 1220 generates a plurality of points within the tile. Each of the plurality of regions includes points of the plurality of points. In the case of octahedron coding of the normals to the surface, there are eight triangular regions: four inner triangles corresponding to the top half of the octahedron and four outer triangles corresponding to the bottom half of the octahedron.

At 1306, the compression computer 1220, via prediction manager 1290, generates a predicted point P representing a predicted normal to the surface. The generation of the predicted point P may be according to a specified heuristic, e.g., a mapping from the face of the octahedron to a triangle in the tile. The predicted point may be outside of a specified baseline region. Typically, the predicted point P approximates the actual location of a normal to the surface during a decoding process. This prediction is accurate when the normal are arranged in a sequence where the differences between consecutive points are small.

At 1308, the compression computer 1220 retrieves an actual point Q, the actual point belonging to the plurality of points.

At 1310, the compression computer 1220 performs a point transformation operation on the first point to produce a transformed first point within the baseline region. The compression computer 1220 then performs the point transformation on the second point to produce a transformed second point within the tile. As discussed above, in the case of octahedron coding of the normals to the surface, when the first point is in an inner triangle, then the point transformation includes a rotation of 90, 180, or 270 degrees. When the first point is in an outer triangle, then the point transformation operation also includes an inversion operation prior to the rotation to place the prediction point in an inner triangle. If the inversion operation places the first point in the baseline region, then no rotation is necessary. All operations performed on the first point are also performed on the second point.

At 1312, the compression computer 1220 generates a difference between the transformed first point and the transformed second point to produce a difference value of a plurality of difference values.

At 1314, the compression computer 1220 encodes the plurality of difference values to produce an encoded difference value. For example, the components of the plurality of difference values may be encoded using an entropy encoding technique such as arithmetic coding or Huffman coding.

Figure 13B:
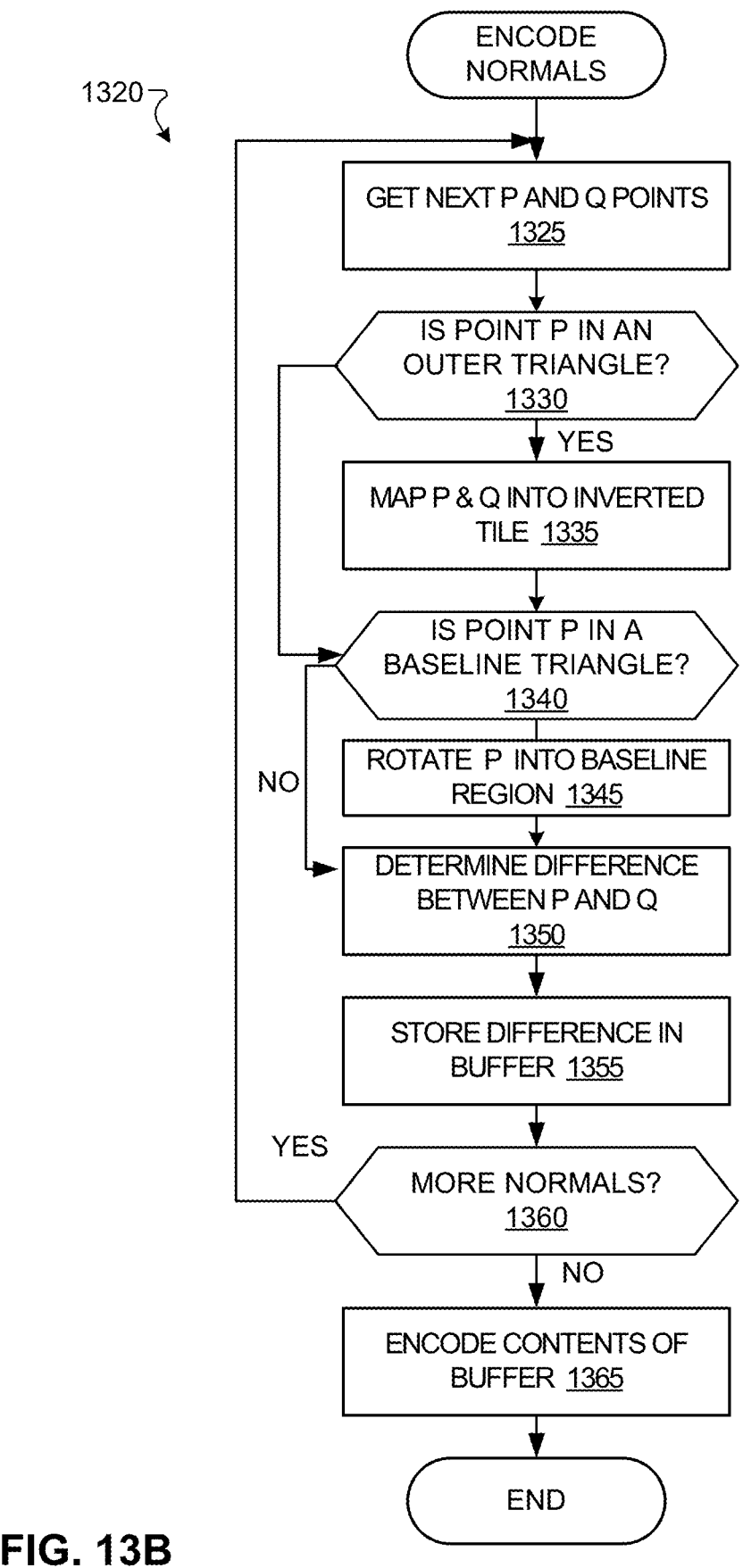
FIG. 13B is a flowchart representing an example method that may be used to encode a normal within the electronic environment illustrated in FIG. 12.

FIG. 13B is a flowchart of an example method 1320 that may be performed to encode normals. The example method may, for example, be implemented as machine-readable instructions performed by one or more processors, such as the example processing units 1224 (FIG. 12), and P00 and P50 (FIG. 16).

The method 1320 of FIG. 13B includes generating a predicted point P and retrieving an actual point Q (block 1325). If the point transformation manager 1250 determines the point P is in an outer triangle of a tile (block 1330), the point transformation manager 1250 maps the point P to a corresponding point P' in an inverted tile and maps the point Q to a corresponding point Q' in the inverted tile (block 1335). If the point P' is not in a baseline triangle in the inverted tile (block 1340), then the point transformation manager 1250 rotates the point P' to a new point P''' in the baseline region (block 1345). The point transformation manager 1250 performs the same rotation to the point Q' to produce the point Q'' (block 1345). The difference manager 1260 determines a difference between the point P''' and the point Q'' (block 1350).

Returning to block 1330, if point transformation manager 1250 determines the point P is in the baseline inner triangle of the base tile (block 1330), the difference manager 1260 determines a difference vector between the point P and the point Q (block 1350). The difference vector is stored within the difference data 1262 in the memory 1226. When all normals have been processed (block 1360), the encoding manager 1270 entropy encodes the contents of the buffer (block 1365), and control exits from the example process of FIG. 13B.

Figure 14A:
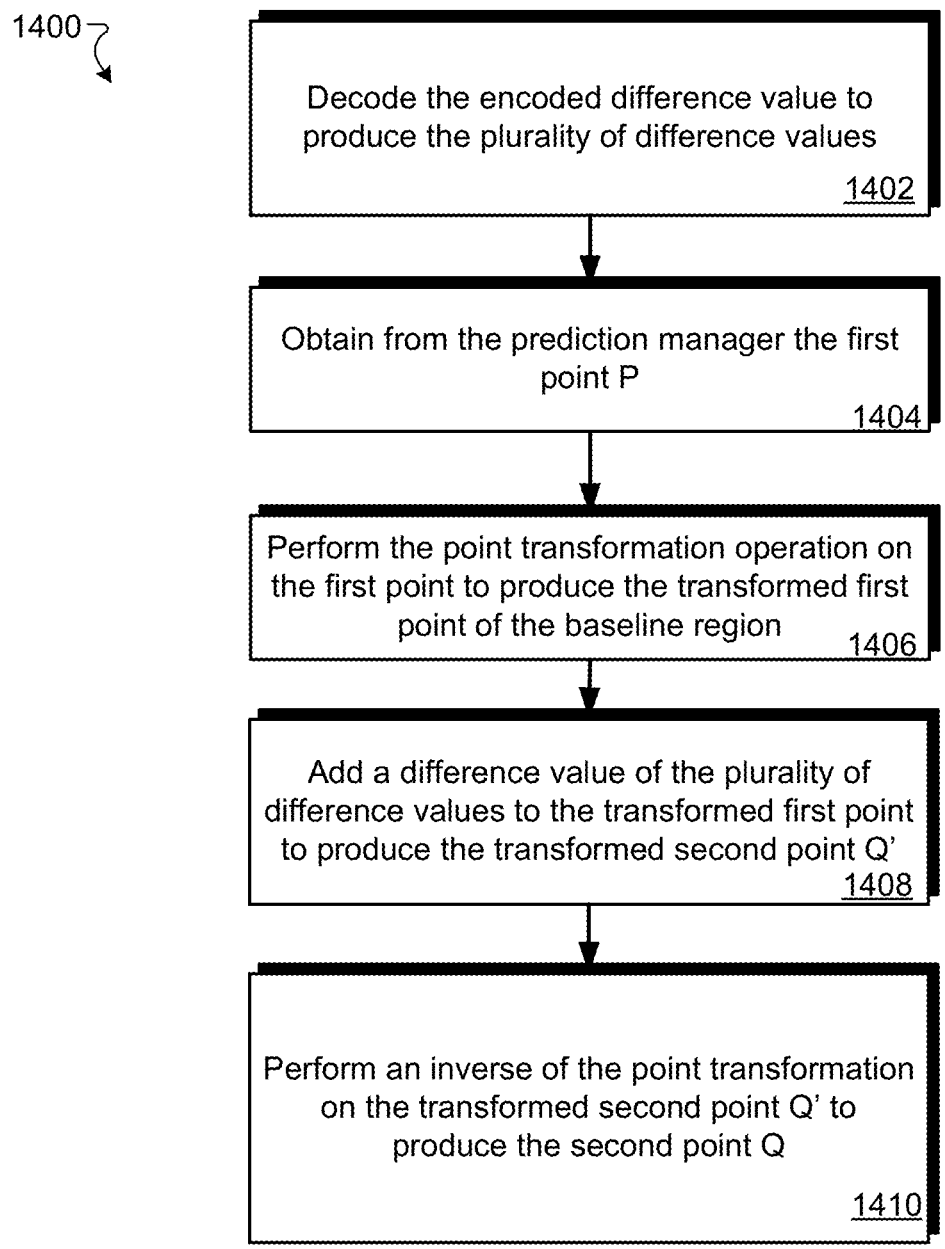
FIG. 14A is a flowchart illustrating another example method of performing the improved techniques within the electronic environment illustrated in FIG. 12.

FIG. 14A is a flowchart that illustrates an example method 1400 of decoding normals of a surface. The method 1400 may be performed by software constructs described in connection with FIG. 1, which reside in memory 1226 of the compression computer 1220 and are run by the set of processing units 1224.

At 1402, the compression computer 1220 decodes the encoded difference value to produce the plurality of difference values. The decoding is performed according to the encoding technique used at 1314 in FIG. 13A.

At 1404, the compression computer 1220 obtains from the prediction manager 1290 (FIG. 12) the first point of the plurality of points. As described above, the prediction operation may involve using a previous actual point.

At 1406, the compression computer 1220 performs the point transformation operation on the first point to produce the transformed first point of the baseline region. In some implementations, the point transformation manager 1250 rotates the first point into the baseline region. If the first point is in an outer triangle, then the point transformation manager 1250 performs an inversion operation to move the first point to a respective inner triangle prior to rotation.

At 1408, the compression computer 1220 adds a difference value of the plurality of difference values to the transformed first point to produce the transformed second point.

At 1410, the compression computer 1220 performs an inverse of the point transformation on the transformed second point to produce the second point. The second point yields a normal to the surface.

Figure 14B:
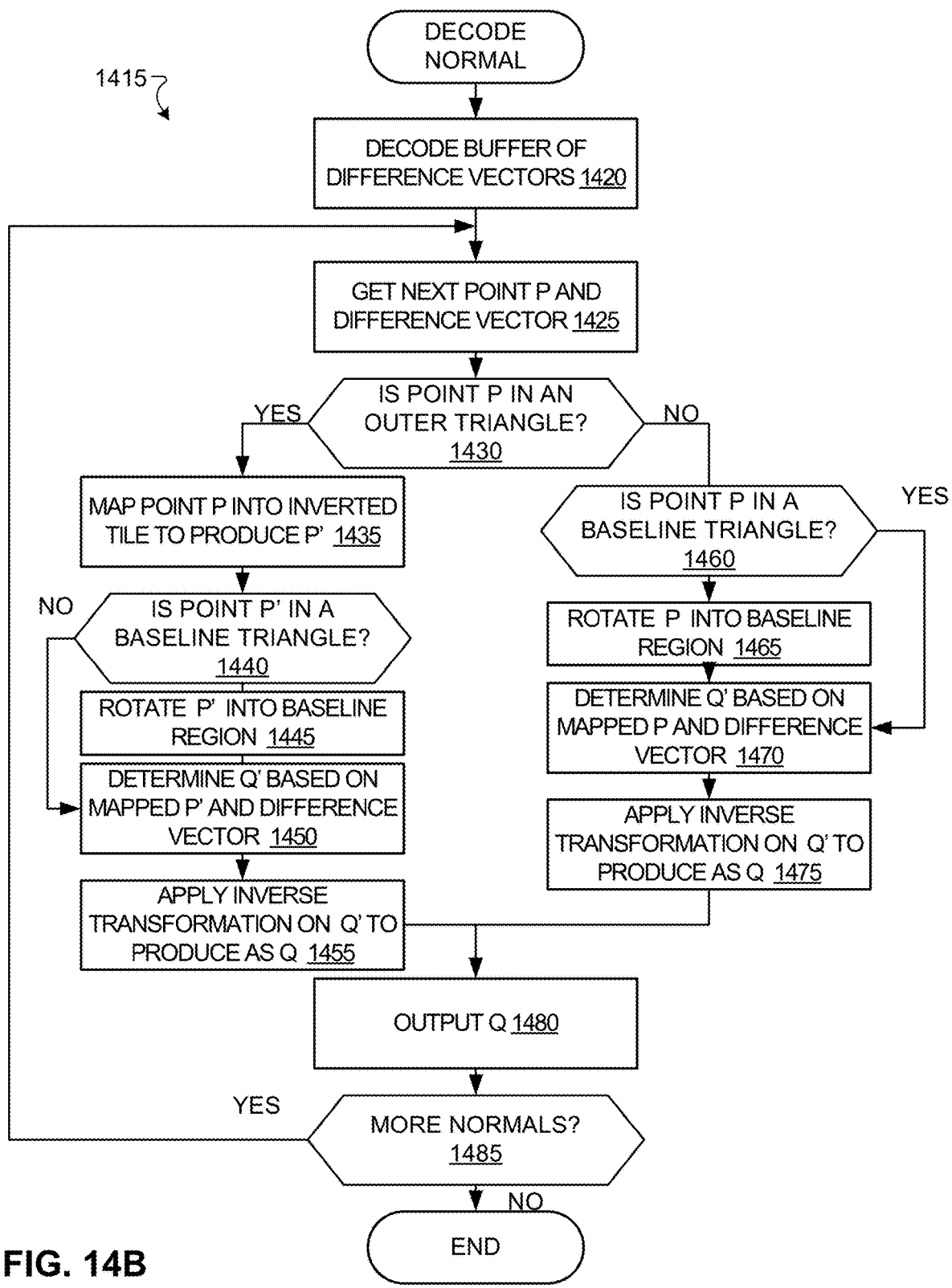
FIG. 14B is a flowchart representing an example method that may be used to decode a normal within the electronic environment illustrated in FIG. 12.
Figure 18:
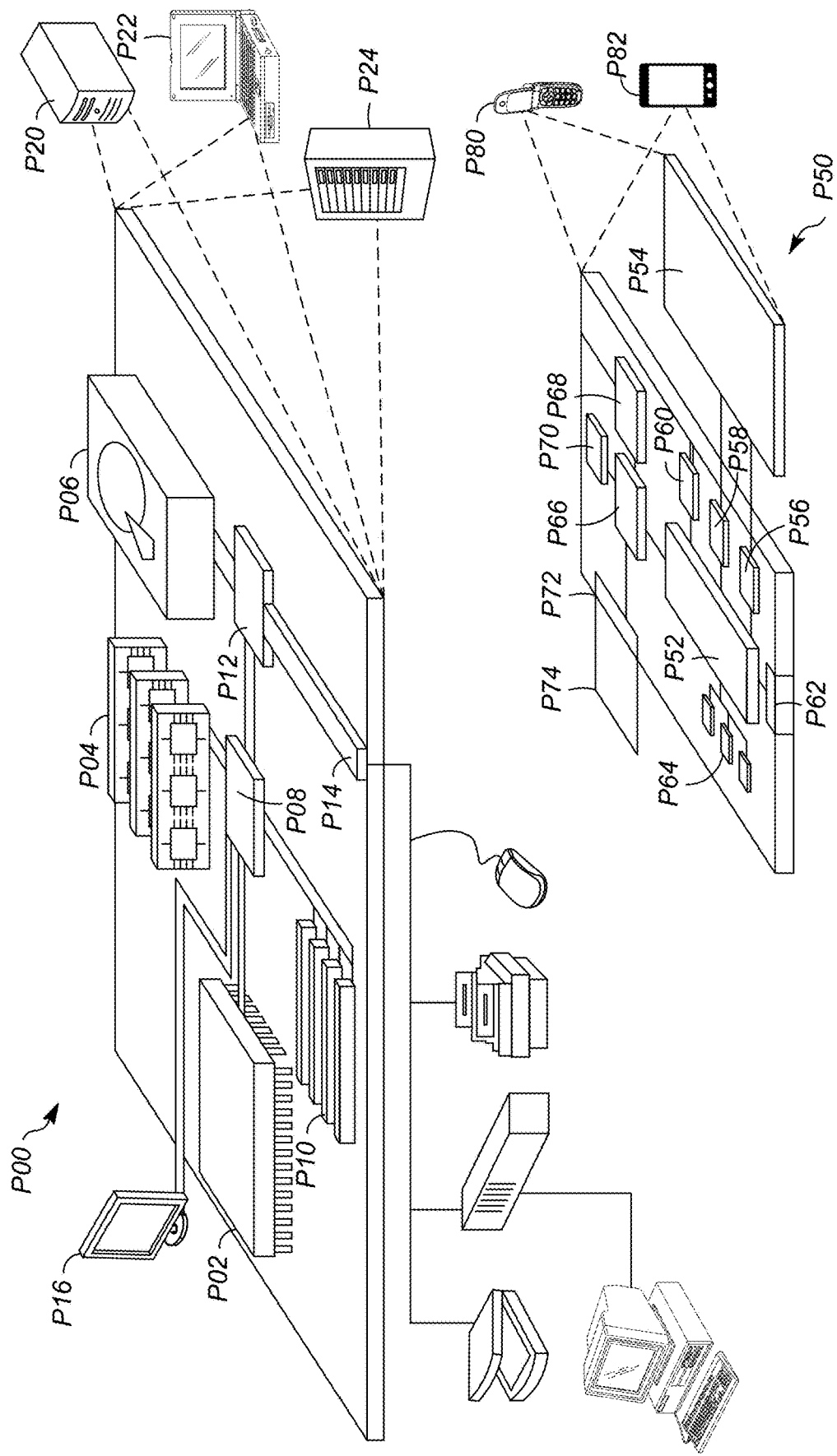
FIG. 18 is a block diagram of an example computer device and an example mobile computer device, which may be used to implement the examples disclosed herein.

FIG. 14B is a flowchart of an example method 1415 that may performed to decode normals. The example method may, for example, be implemented as machine-readable instructions performed by one or more processors, such as the example processing units 1224 (FIG. 12), and P00 and P50 (FIG. 18).

The example method 1415 of FIG. 14B includes the decoding manager 1280 decoding a buffer of encoded difference vectors (block 1420). For a predicted point P and a difference vector (block 1425), if the point transformation manager 1250 determines the point P is in an inner triangle of the tile (block 1430), and if the point P is not in a baseline triangle (block 1460), then the point transformation manager 1250 rotates the point P into a baseline region (1465) and determines the point Q' based on the point P and difference vector (block 1470), and upon application of the inverse transformation on Q' (block 1475), the point Q is output (block 1480).

Returning to block 1430, if the point transformation manager 1250 determines the point P is in an outer triangle of the tile (block 1430), the point transformation manager 1250 maps the point P to a corresponding point P' in an inverted tile (block 1435). The difference manager 1460 rotates the point P' into a baseline region (1445), determines the point Q' based on the point P' and the difference vector (block 1450), performs an inverse transformation on the point Q' to produce the point Q (block 1455), and outputs the point Q (block 1480). Note that, in this case, the inverse transformation includes another inversion.

When all normals have been processed (block 1485), control exits from the example process of FIG. 14B.

FIGS. 15A-15C illustrate an example method of encoding normals according to the improved techniques. FIGS. 15A-15C show an example point transformation operation that includes an inversion operation as well as a rotation operation. As illustrated in FIGS. 15A-15C, the labels of the regions have been changed with each transformation. Briefly, when a point is disposed on the uncut half of the octahedron, a first tile is used, the point is disposed on an inner triangle of the first tile. When a point is disposed on the cut half of the octahedron, the point is shifted in an inversion to an inner triangle that is symmetric with respect to the boundary between the upper triangles and the lower triangles. In some implementations, placing the point in a new tile that is inverted from the original tile may be considered.

In this case, it may be said that there are a pair of tiles for each octahedron. For other geometric shapes, the number of tiles and/or their constituents may change.

FIG. 15A illustrates a first point P and a second point Q in a tile. The tile has four outer triangles labeled SA, SB, SC, and SD and four inner triangles labeled S1, S2, S3, and S4. The first point P is in the outer triangle SA and the second point Q is in the inner triangle S2.

FIG. 15B illustrates the first point P and the second point Q after an inversion operation is performed by the point transformation manager 1250 (FIG. 12). In this case, the first point P is reflected across the line that separated triangles SA and S1 to produce an inverted first point P'. Accordingly, the second point Q is also reflected, but across the line that separates the triangles SB and S2, to produce an inverted second point Q'. To track this inversion operation, the regions of the tile post-inversion are relabeled with the inner triangles labeled as SA', SB', SC', and SD' with the outer triangles labeled as S1', S2', S3', and S4'. The inverted first point P' is in triangle SA' and the inverted second point Q' is in triangle S2'.

Further, FIG. 15B also illustrates the baseline region, here SD', as the lower left inner triangle. As illustrated in FIG. 15B as well as FIG. 15C, this baseline region is slightly shaded to differentiate it from the other triangles.

FIG. 15C illustrates the first point and the second point after respective rotation operations that put the first point in the baseline region. In this case, the point transformation manager 1250 rotates the first inverted point P' by an angle of 90 degrees to produce a transformed first point P'''. The point transformation manager 1250 also applies the same 90-degree rotation to the second inverted point Q' to produce a second transformed point Q'''. To track this rotation operation, the regions of the tile post-rotation are relabeled with respective inner triangles SB'', SC'', SD'', and SA'' and outer triangles S2'', S3'', S4'', and S1''. Note that the transformed first point P''' is in the baseline region, which is now SA'', and the transformed second point Q''' is in the triangle S2''.

The difference manager 1260 (FIG. 12) computes the difference Q'''-P''', e.g., for each component. The encoding manager 1270 then encodes this difference using an entropy encoding scheme. Because of the fact that P''' is in the lower left inner triangle SA'', the range of possible differences is half of that without the rotation performed as illustrated in FIG. 15C.

FIGS. 16A-16E illustrate an example method of decoding normals according to the improved techniques. For decoding, the compression computer 1220 retrieves (or generates) a predicted point P and a difference. The difference is decoded from the entropy-encoded difference stored in memory 1226 (FIG. 12).

FIG. 16A illustrates a predicted point P in the tile. In this case, the predicted point P is in the outer triangle SB. The labels of the regions are the same as those in the tile illustrated in FIG. 15A.

FIG. 16B illustrates the predicted point P after an inversion operation is performed by the point transformation manager 1250 (FIG. 12) to produce an inverted predicted point P'. To track this inversion operation, the regions of the tile post-inversion are relabeled with the inner triangles labeled as SA', SB', SC', and SD' with the outer triangles labeled as S1', S2', S3', and S4'. The inverted predicted point P' is in triangle SB'.

FIG. 16C illustrates the predicted point after respective rotation operations that put the predicted point in the baseline region. In this case, the point transformation manager 1250 rotates the inverted predicted point P' by an angle of 180 degrees to produce a transformed predicted point P'''. To track this rotation operation, the regions of the tile post-rotation are relabeled with respective inner triangles SC'', SD'', SA'', and SB'' and outer triangles S3'', S4'', S1'', and S2''. Note that the transformed predicted point P''' is in the baseline region, which is now SB''.

Further, FIG. 16C also illustrates a transformed actual point Q''', which is generated by adding the difference to the transformed predicted point P'''. In FIG. 15C, the transformed actual point Q''' is in the outer triangle S3''.

FIG. 16D illustrates an inverse of the rotation operation on the transformed actual point Q''' to produce the inverted actual point Q' in the outer triangle S3'.

FIG. 16E illustrates an inversion operation on the inverted actual point Q' to produce the actual point Q in inner triangle S3. It is this actual point Q that represents a normal to the surface.

FIG. 17 is a table showing example compression gains that may be obtained using the example methods disclosed herein. The table of FIG. 17 compares four compression methods: naïve correction encoding, the periodic tiling of FIGS. 2A, 2B, 4, 5 and 6, the inverted tiling of FIGS. 7A-C, 8A-C, 9 and 10, and the baselined inverted tiling of FIGS. 13A-B, 14A-B, 15A-C, and 16A-E. The table shows compression performance for the four methods for three models: the Stanford Bunny, a Buddha, and an extra large (XL) model of Boston. In this comparison, the actual point Q for a normal is used as the predicted point P for the next normal. The table shows the number of bytes occupied by the normals. The table also shows the reduction in percentage (%) in the number of bytes yielded by each of the methods, for each of the three models. As shown, the methods disclosed herein provide meaningful improvements in compression of approximately 1.5% to 2.5% depending on the surface characteristics. For example, the Bunny and Buddha models have more surface direction variations, and the Boston XL model has more normals in the same direction. Nevertheless, the baselined inverted tiling shows an improvement over the inverted tiling while greatly reducing the amount of storage over the periodic tiling.

V. Hardware Implementations

One or more of the elements and interfaces disclosed herein may be duplicated, implemented in the parallel, implemented in the singular, combined, divided, re-arranged, omitted, eliminated and/or implemented in any other way. Further, any of the disclosed elements and interfaces may be implemented by a processor, a computer and/or a machine having a processor, such as the example processor platforms P00 and P50 discussed below in connection with FIG. 16. Example processors include, but are not limited to a circuit, a programmable processor, fuses, an application-specific integrated circuit (ASIC), a programmable logic device (PLD), a field-programmable logic device (FPLD), a field-programmable gate array (FPGA), a digital signal processor (DSP), a graphics processing unit (GPU), a central processing unit (CPU), a microcontroller, a controller, etc. Any of the elements and interfaces disclosed herein may, for example, be implemented as instruction, program code, machine-readable instructions, etc. performed by one or more of a processor, a computer and/or a machine having a processor. A processor, a computer and/or a machine having a processor may be used, configured and/or programmed to execute and/or carry out the examples disclosed herein. For example, any of the examples may be embodied in instructions, program code, machine-readable instructions, etc. stored on a tangible and/or non-transitory computer-readable medium accessible by a processor, a computer and/or other machine having a processor, such as the example processor platforms P00 and P50 discussed below in connection with FIG. 16. Machine-readable instructions include, for example, instructions that cause a processor, a computer and/or a machine having a processor to perform one or more particular processes or methods. When a claim of this patent incorporating one or more of the elements of FIG. 12 is read to cover a purely software and/or firmware implementation, at least one of the elements of FIG. 12 is hereby expressly defined to include a tangible article of manufacture such as a tangible machine-readable medium storing machine-readable instructions such as the firmware and/or software.

The example methods disclosed herein may, for example, be implemented as instructions, program code, machine-readable instructions performed by a processor, a computer and/or other machine having a processor. A processor, a controller and/or any other suitable processing device such as those shown in FIG. 16 may be used, configured and/or programmed to execute and/or carry out the example methods. For example, they may be embodied in instructions, program code and/or machine-readable instructions stored on a tangible and/or non-transitory computer-readable medium accessible by a processor, a computer and/or other machine having a processor, such as those discussed below in connection with FIG. 16. Many other methods of implementing the example methods may be employed. For example, the order of execution may be changed, and/or one or more of the blocks and/or interactions described may be changed, eliminated, subdivided, or combined. Additionally, any or the entire example methods may be performed sequentially and/or performed in parallel by, for example, separate processing threads, processors, devices, discrete logic, circuits, etc.

As used herein, the terms "computer-readable medium" and "machine-readable medium" expressly exclude propagating signals. Example computer-readable or machine-readable medium include, but are not limited to, one or any combination of a volatile and/or non-volatile memory, a volatile and/or non-volatile memory device, a compact disc (CD), a digital versatile disc (DVD), a read-only memory (ROM), a random-access memory (RAM), a FLASH drive, a floppy disk, a Synchronous Dynamic Random Access Memory (SDRAM), a Dynamic Random Access Memory (DRAM), a RAMBUS Dynamic Random Access Memory (RDRAM) a programmable ROM (PROM), an electronically-programmable ROM (EPROM), an electronically-erasable PROM (EEPROM), a solid state (SS) memory, a solid state disk (SSD), an optical storage disk, an optical storage device, a magnetic storage disk, a network-attached storage (NAS) device, a magnetic storage device, a cache, and/or any other storage media in which information is stored for any duration (e.g., for extended time periods, permanently, brief instances, for temporarily buffering, and/or for caching of the information) and that can be accessed by a processor, a computer and/or other machine having a processor.

FIG. 16 shows an example of a generic computer device P00 and a generic mobile computer device P50, which may be used with the techniques described here. Computing device P00 is intended to represent various forms of digital computers, such as laptops, desktops, tablets, workstations, personal digital assistants, televisions, servers, blade servers, mainframes, and other appropriate computing devices. Computing device P50 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device P00 includes a processor P02, memory P04, a storage device P06, a high-speed interface P08 connecting to memory P04 and high-speed expansion ports P10, and a low speed interface P12 connecting to low speed bus P14 and storage device P06. The processor P02 can be a semiconductor-based processor. The memory P04 can be a semiconductor-based memory. Each of the components P02, P04, P06, P08, P10, and P12, are interconnected using various busses, and may be mounted on a common motherboard or in other manners as appropriate. The processor P02 can process instructions for execution within the computing device P00, including instructions stored in the memory P04 or on the storage device P06 to display graphical information for a GUI on an external input/output device, such as display P16 coupled to high speed interface P08. In other implementations, multiple processors and/or multiple buses may be used, as appropriate, along with multiple memories and types of memory. Also, multiple computing devices P00 may be connected, with each device providing portions of the necessary operations (e.g., as a server bank, a group of blade servers, or a multi-processor system).

The memory P04 stores information within the computing device P00. In one implementation, the memory P04 is a volatile memory unit or units. In another implementation, the memory P04 is a non-volatile memory unit or units. The memory P04 may also be another form of computer-readable medium, such as a magnetic or optical disk.

The storage device P06 is capable of providing mass storage for the computing device P00. In one implementation, the storage device P06 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory P04, the storage device P06, or memory on processor P02.

The high speed controller P08 manages bandwidth-intensive operations for the computing device P00, while the low speed controller P12 manages lower bandwidth-intensive operations. Such allocation of functions is exemplary only. In one implementation, the high-speed controller P08 is coupled to memory P04, display P16 (e.g., through a graphics processor or accelerator), and to high-speed expansion ports P10, which may accept various expansion cards (not shown). In the implementation, low-speed controller P12 is coupled to storage device P06 and low-speed expansion port P14. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device P00 may be implemented in a number of different forms, as shown in the figure. For example, it may be implemented as a standard server P20, or multiple times in a group of such servers. It may also be implemented as part of a rack server system P24. In addition, it may be implemented in a personal computer such as a laptop computer P22. Alternatively, components from computing device P00 may be combined with other components in a mobile device (not shown), such as device P50. Each of such devices may contain one or more of computing device P00, P50, and an entire system may be made up of multiple computing devices P00, P50 communicating with each other.

Computing device P50 includes a processor P52, memory P64, an input/output device such as a display P54, a communication interface P66, and a transceiver P68, among other components. The device P50 may also be provided with a storage device, such as a microdrive or other device, to provide additional storage. Each of the components P50, P52, P64, P54, P66, and P68, are interconnected using various buses, and several of the components may be mounted on a common motherboard or in other manners as appropriate.

The processor P52 can execute instructions within the computing device P50, including instructions stored in the memory P64. The processor may be implemented as a chipset of chips that include separate and multiple analog and digital processors. The processor may provide, for example, for coordination of the other components of the device P50, such as control of user interfaces, applications run by device P50, and wireless communication by device P50.

Processor P52 may communicate with a user through control interface P58 and display interface P56 coupled to a display P54. The display P54 may be, for example, a TFT LCD (Thin-Film-Transistor Liquid Crystal Display) or an OLED (Organic Light Emitting Diode) display, or other appropriate display technology. The display interface P56 may comprise appropriate circuitry for driving the display P54 to present graphical and other information to a user. The control interface P58 may receive commands from a user and convert them for submission to the processor P52. In addition, an external interface P62 may be provided in communication with processor P52, so as to enable near area communication of device P50 with other devices. External interface P62 may provide, for example, for wired communication in some implementations, or for wireless communication in other implementations, and multiple interfaces may also be used.

The memory P64 stores information within the computing device P50. The memory P64 can be implemented as one or more of a computer-readable medium or media, a volatile memory unit or units, or a non-volatile memory unit or units. Expansion memory P74 may also be provided and connected to device P50 through expansion interface P72, which may include, for example, a SIMM (Single In Line Memory Module) card interface. Such expansion memory P74 may provide extra storage space for device P50, or may also store applications or other information for device P50. Specifically, expansion memory P74 may include instructions to carry out or supplement the processes described above, and may include secure information also. Thus, for example, expansion memory P74 may be provided as a security module for device P50, and may be programmed with instructions that permit secure use of device P50. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory P64, expansion memory P74, or memory on processor P52 that may be received, for example, over transceiver P68 or external interface P62.

Device P50 may communicate wirelessly through communication interface P66, which may include digital signal processing circuitry where necessary. Communication interface P66 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver P68. In addition, short-range communication may occur, such as using a Bluetooth, Wi-Fi, or other such transceiver (not shown). In addition, GPS (Global Positioning System) receiver module P70 may provide additional navigation- and location-related wireless data to device P50, which may be used as appropriate by applications running on device P50.

Device P50 may also communicate audibly using audio codec P60, which may receive spoken information from a user and convert it to usable digital information. Audio codec P60 may likewise generate audible sound for a user, such as through a speaker, e.g., in a handset of device P50. Such sound may include sound from voice telephone calls, may include recorded sound (e.g., voice messages, music files, etc.) and may also include sound generated by applications operating on device P50.

The computing device P50 may be implemented in a number of different forms, as shown in the figure. For example, it may be implemented as a cellular telephone P80. It may also be implemented as part of a smart phone P82, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In this specification and the appended claims, the singular forms "a," "an" and "the" do not exclude the plural reference unless the context clearly dictates otherwise. Further, conjunctions such as "and," "or," and "and/or" are inclusive unless the context clearly dictates otherwise. For example, "A and/or B" includes A alone, B alone, and A with B. Further, connecting lines or connectors shown in the various figures presented are intended to represent exemplary functional relationships and/or physical or logical couplings between the various elements. Many alternative or additional functional relationships, physical connections or logical connections may be present in a practical device. Moreover, no item or component is essential to the practice of the embodiments disclosed herein unless the element is specifically described as "essential" or "critical".

Terms such as, but not limited to, approximately, substantially, generally, etc. are used herein to indicate that a precise value or range thereof is not required and need not be specified. As used herein, the terms discussed above will have ready and instant meaning to one of ordinary skill in the art.

Moreover, use of terms such as up, down, top, bottom, side, end, front, back, etc. herein are used with reference to a currently considered or illustrated orientation. If they are considered with respect to another orientation, it should be understood that such terms must be correspondingly modified.

Further, in this specification and the appended claims, the singular forms "a," "an" and "the" do not exclude the plural reference unless the context clearly dictates otherwise. Moreover, conjunctions such as "and," "or," and "and/or" are inclusive unless the context clearly dictates otherwise. For example, "A and/or B" includes A alone, B alone, and A with B.

Although certain example methods, apparatuses and articles of manufacture have been described herein, the scope of coverage of this patent is not limited thereto. It is to be understood that terminology employed herein is for the purpose of describing particular aspects, and is not intended to be limiting. On the contrary, this patent covers all methods, apparatus and articles of manufacture fairly falling within the scope of the claims of this patent.

What is claimed is:

1. A method, comprising:
    receiving, by a processor of a computer configured to store information related to normals to a surface of a three-dimensional object, a plurality of points, each point of the plurality of points representing a normal to the surface and being arranged within a tile;
    generating, by the processor, a plurality of regions within the tile, each of the plurality of regions including points of the plurality of points;
    generating, by the processor, a first point representing a predicted normal to the surface;
    retrieving, by the processor, a second point of the plurality of points, the second point representing an actual normal to the surface;
    performing, by the processor, a point transformation operation on the first point to produce a transformed first point of a specified baseline region and performing the point transformation operation on the second point to produce a transformed second point, the point transformation operation including a rotation operation that rotates the first point by an angle into the specified baseline region, the angle depending on a position of the first point within the tile;
    generating, by the processor, a difference between the transformed first point and the transformed second point to produce a difference value of a plurality of difference values; and
    encoding, by the processor, the plurality of difference values to produce an encoded difference value.

2. The method as in claim 1, further comprising:
    decoding the encoded difference value to produce the plurality of difference values;
    obtaining the first point;
    performing the point transformation operation on the first point to produce the transformed first point of the baseline region;
    adding a difference value of the plurality of difference values to the transformed first point to produce the transformed second point; and
    performing an inverse of the point transformation on the transformed second point to produce the second point.

3. The method as in claim 1, wherein each of the plurality of regions corresponds to a face of an octahedron inscribed in a unit sphere, and each of the plurality of regions is a right triangle;
    wherein the tile is a square, the octahedron has an upper portion and a lower portion, and the plurality of regions contains a plurality of inner triangles inscribed in the square and a plurality of outer triangles inscribed in the square, each of the plurality of inner triangles corresponding to a respective face on the upper portion, each of the plurality of outer triangles corresponding to a respective face on the lower portion,
    wherein a baseline inner triangle of the plurality of inner triangles is the baseline region,
    wherein retrieving the first point includes:
        locating an initial first point within an outer triangle of the plurality of outer triangles; and
        prior to performing the point transformation operation, performing an inversion operation on the initial first point to produce the first point in an inner triangle of the plurality of inner triangles.

4. The method as in claim 3, wherein performing the point transformation operation on the first point includes applying a rotation to the first point to produce the transformed first point in the baseline inner triangle.

5. The method as in claim 3, wherein performing the point transformation operation on the first point includes applying a reflection operation to the first point about an axis of symmetry of the tile to produce the transformed first point in the baseline inner triangle.

6. The method as in claim 1, wherein receiving the plurality of points includes performing a quantization operation to produce, as the plurality of points, a grid of points, each of the grid of points representing a quantized normal to the surface.

7. The method as in claim 1, wherein encoding the set of difference values includes applying an entropy encoding to each of the set of difference values.

8. A computer program product comprising a non-transitory storage medium, the computer program product including code that, when executed by processing circuitry of a sound rendering computer configured to store information related to normals to a surface of a three-dimensional object, causes the processing circuitry to perform a method, the method comprising:
receiving a plurality of points, each point of the plurality of points representing a normal to the surface and being arranged within a tile;
generating a plurality of regions within the tile, each of the plurality of regions including points of the plurality of points;
generating a first point representing a predicted normal to the surface;
retrieving a second point of the plurality of points, the second point representing an actual normal to the surface;
performing a point transformation operation on the first point to produce a transformed first point of a specified baseline region and performing the point transformation operation on the second point to produce a transformed second point, the point transformation operation including a rotation operation that rotates the first point by an angle into the specified baseline region, the angle depending on a position of the first point within the tile;
generating a difference between the transformed first point and the transformed second point to produce a difference value of a plurality of difference values; and
encoding the plurality of difference values to produce an encoded difference value.

9. The computer program product as in claim 8, further comprising:
decoding the encoded difference value to produce the plurality of difference values;
obtaining the first point;
performing the point transformation operation on the first point to produce the transformed first point of the baseline region;
adding a difference value of the plurality of difference values to the transformed first point to produce the transformed second point; and
performing an inverse of the point transformation on the transformed second point to produce the second point.

10. The computer program product as in claim 8, wherein each of the plurality of regions corresponds to a face of an octahedron inscribed in a unit sphere, and each of the plurality of regions is a right triangle;
wherein the tile is a square, the octahedron has an upper portion and a lower portion, and the plurality of regions contains a plurality of inner triangles inscribed in the square and a plurality of outer triangles inscribed in the square, each of the plurality of inner triangles corresponding to a respective face on the upper portion, each of the plurality of outer triangles corresponding to a respective face on the lower portion,
wherein a baseline inner triangle of the plurality of inner triangles is the baseline region,
wherein retrieving the first point includes:
locating an initial first point within an outer triangle of the plurality of outer triangles; and
prior to performing the point transformation operation, performing an inversion operation on the initial first point to produce the first point in an inner triangle of the plurality of inner triangles.

11. The computer program product as in claim 10, wherein performing the point transformation operation on the first point includes applying a rotation to the first point to produce the transformed first point in the baseline inner triangle.

12. The computer program product as in claim 10, wherein performing the point transformation operation on the first point includes applying a reflection operation to the first point about an axis of symmetry of the tile to produce the transformed first point in the baseline inner triangle.

13. The computer program product as in claim 8, wherein receiving the plurality of points includes performing a quantization operation to produce, as the plurality of points, a grid of points, each of the grid of points representing a quantized normal to the surface.

14. The computer program product as in claim 8, wherein encoding the set of difference values includes applying an entropy encoding to each of the set of difference values.

15. An electronic apparatus configured to store information related to normals to a surface of a three-dimensional object, the electronic apparatus comprising:
memory; and
controlling circuitry coupled to the memory, the controlling circuitry being configured to:
receive a plurality of points, each point of the plurality of points representing a normal to the surface and being arranged within a tile;
generate a plurality of regions within the tile, each of the plurality of regions including points of the plurality of points;
generate a first point representing a predicted normal to the surface;
retrieve a second point of the plurality of points, the second point representing an actual normal to the surface;
perform a point transformation operation on the first point to produce a transformed first point of a specified baseline region and performing the point transformation operation on the second point to produce a transformed second point, the point transformation operation including a rotation operation that rotates the first point by an angle into the specified baseline region, the angle depending on a position of the first point within the tile;
generate a difference between the transformed first point and the transformed second point to produce a difference value of a plurality of difference values; and
encode the plurality of difference values to produce an encoded difference value.

16. The electronic apparatus as in claim 15, wherein the controlling circuitry is further configured to:

decode the encoded difference value to produce the plurality of difference values;

obtain the first point;

perform the point transformation operation on the first point to produce the transformed first point of the baseline region;

add a difference value of the plurality of difference values to the transformed first point to produce the transformed second point; and perform an inverse of the point transformation on the transformed second point to produce the second point.

17. The electronic apparatus as in claim 15, wherein each of the plurality of regions corresponds to a face of an octahedron inscribed in a unit sphere, and each of the plurality of regions is a right triangle;

wherein the tile is a square, the octahedron has an upper portion and a lower portion, and the plurality of regions contains a plurality of inner triangles inscribed in the square and a plurality of outer triangles inscribed in the square, each of the plurality of inner triangles corresponding to a respective face on the upper portion, each of the plurality of outer triangles corresponding to a respective face on the lower portion, wherein a baseline inner triangle of the plurality of inner triangles is the baseline region, wherein the controlling circuitry configured to retrieve the first point is further configured to:

locate an initial first point within an outer triangle of the plurality of outer triangles; and prior to performing the point transformation operation, perform an inversion operation on the initial first point to produce the first point in an inner triangle of the plurality of inner triangles.

18. The electronic apparatus as in claim 17, wherein the controlling circuitry configured to perform the point transformation operation on the first point is further configured to apply a rotation to the first point to produce the transformed first point in the baseline inner triangle.

19. The electronic apparatus as in claim 17, wherein the controlling circuitry configured to perform the point transformation operation on the first point is further configured to apply a reflection operation to the first point about an axis of symmetry of the tile to produce the transformed first point in the baseline inner triangle.

20. The electronic apparatus as in claim 15, wherein the controlling circuitry configured to wherein receive the plurality of points is further configured to perform a quantization operation to produce, as the plurality of points, a grid of points, each of the grid of points representing a quantized normal to the surface.

\* \* \* \* \*